US011930512B2

(12) United States Patent
Lee et al.

(10) Patent No.: US 11,930,512 B2
(45) Date of Patent: Mar. 12, 2024

(54) METHOD AND APPARATUS FOR PERFORMING RANGING IN WIRELESS COMMUNICATION SYSTEM

(71) Applicant: Samsung Electronics Co., Ltd., Gyeonggi-do (KR)

(72) Inventors: Mingyu Lee, Gyeonggi-do (KR); Seongah Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 335 days.

(21) Appl. No.: 17/297,197

(22) PCT Filed: Dec. 5, 2019

(86) PCT No.: PCT/KR2019/017071
§ 371 (c)(1),
(2) Date: May 26, 2021

(87) PCT Pub. No.: WO2020/116949
PCT Pub. Date: Jun. 11, 2020

(65) Prior Publication Data
US 2022/0007333 A1    Jan. 6, 2022

(30) Foreign Application Priority Data

Dec. 7, 2018 (KR) .......... 10-2018-0157586
Jan. 11, 2019 (KR) .......... 10-2019-0003954

(51) Int. Cl.
*H04W 72/30* (2023.01)
*H04W 4/70* (2018.01)
(Continued)

(52) U.S. Cl.
CPC ............. *H04W 72/30* (2023.01); *H04W 4/70* (2018.02); *H04W 72/54* (2023.01); *H04W 76/14* (2018.02); *H04W 76/40* (2018.02)

(58) Field of Classification Search
CPC ....... H04W 72/30; H04W 4/70; H04W 76/14; H04W 76/40; H04W 72/54
(Continued)

(56) References Cited

U.S. PATENT DOCUMENTS

| 8,462,726 B2 | 6/2013 | Park et al. | |
| 2004/0174845 A1* | 9/2004 | Koo | H04W 36/0055 370/328 |

(Continued)

FOREIGN PATENT DOCUMENTS

KR    10-1365871    2/2014

OTHER PUBLICATIONS

Data Sheet for the Decawave DW1000 (Year: 2017).*
(Continued)

*Primary Examiner* — Mark G. Pannell
(74) *Attorney, Agent, or Firm* — The Farrell Law Firm, P.C.

(57) ABSTRACT

In an embodiment of the disclosure, a method of operating an electronic device to perform ranging using ultra wideband (UWB) in a wireless communication system includes broadcasting or multicasting a first message to start the ranging; and transmitting a third message, based on whether a second message to respond to the first message is received within a predetermined period from another electronic device having received the first message.

11 Claims, 24 Drawing Sheets

(51) Int. Cl.
*H04W 72/54* (2023.01)
*H04W 76/14* (2018.01)
*H04W 76/40* (2018.01)

(58) Field of Classification Search
USPC .......................................................... 370/329
See application file for complete search history.

(56) References Cited

U.S. PATENT DOCUMENTS

2004/0252655 A1* 12/2004 Lim .................. H04B 7/18539
  370/321
2005/0026563 A1*  2/2005 Leeper ................ G01S 13/0209
  455/41.1
2009/0016316 A1   1/2009 Ogawa
2014/0334401 A1  11/2014 Zhang et al.
2016/0337219 A1  11/2016 Smith
2017/0086086 A1   3/2017 Bhatia et al.
2017/0261591 A1*  9/2017 Zhang ...................... G01S 5/12
2018/0324855 A1  11/2018 Huang et al.
2019/0230478 A1*  7/2019 Peppler ................ G01S 13/825

OTHER PUBLICATIONS

Seongah Jeong et al., "Inclusion of Multicast/Broadcast Ranging in Information Element", Project: IEEE P802.15 Working Group for Wireless Personal Area Networks (WPANs), Nov. 2018, 16 pages.
Subodh Pudasaini et al., "Initial Ranging for Prioritized Network Entry in IEEE 802.16 Network", Dec. 5, 2013, 15 pages.
International Search Report dated Mar. 25, 2020 issued in counterpart application No. PCT/KR2019/017071, 15 pages.
Korean Office Action dated Feb. 8, 2023 Issued in counterpart application No. 10-2019-0003954, 8 pages.

\* cited by examiner

METHOD AND APPARATUS FOR PERFORMING RANGING IN WIRELESS COMMUNICATION SYSTEM

PRIORITY

This application is a National Phase Entry of PCT International Application No. PCT/KR2019/017071, which was filed on Dec. 5, 2019, and claims priority to Korean Patent Application Nos. 10-2018-0157586 and 10-2019-0003954, which were filed on Dec. 7, 2018 and Jan. 11, 2019, respectively, the entire content of each of which is incorporated herein by reference.

TECHNICAL FIELD

The disclosure relates to a method and apparatus for performing ranging in a wireless communication system.

BACKGROUND ART

The Internet is evolving from a human-oriented connectivity network where humans generate and consume information to an Internet of things (IoT) network where distributed entities or things exchange information between them and process the information. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart home, smart buildings, smart cities, smart cars or connected cars, smart grid, health care, smart home appliances and advanced medical services through convergence and combination between existing information technologies (IT) and various industrial applications.

With the development of wireless communication systems, it is possible to provide various services, and there is a need for a method to provide the services effectively. A method of effectively performing ranging between a plurality of electronic devices is also required.

DESCRIPTION OF EMBODIMENTS

Solution to Problem

Embodiments of the disclosure provide a method and apparatus for performing ranging on an ultra wideband (UWB) basis.

BEST MODE

Figure 1:
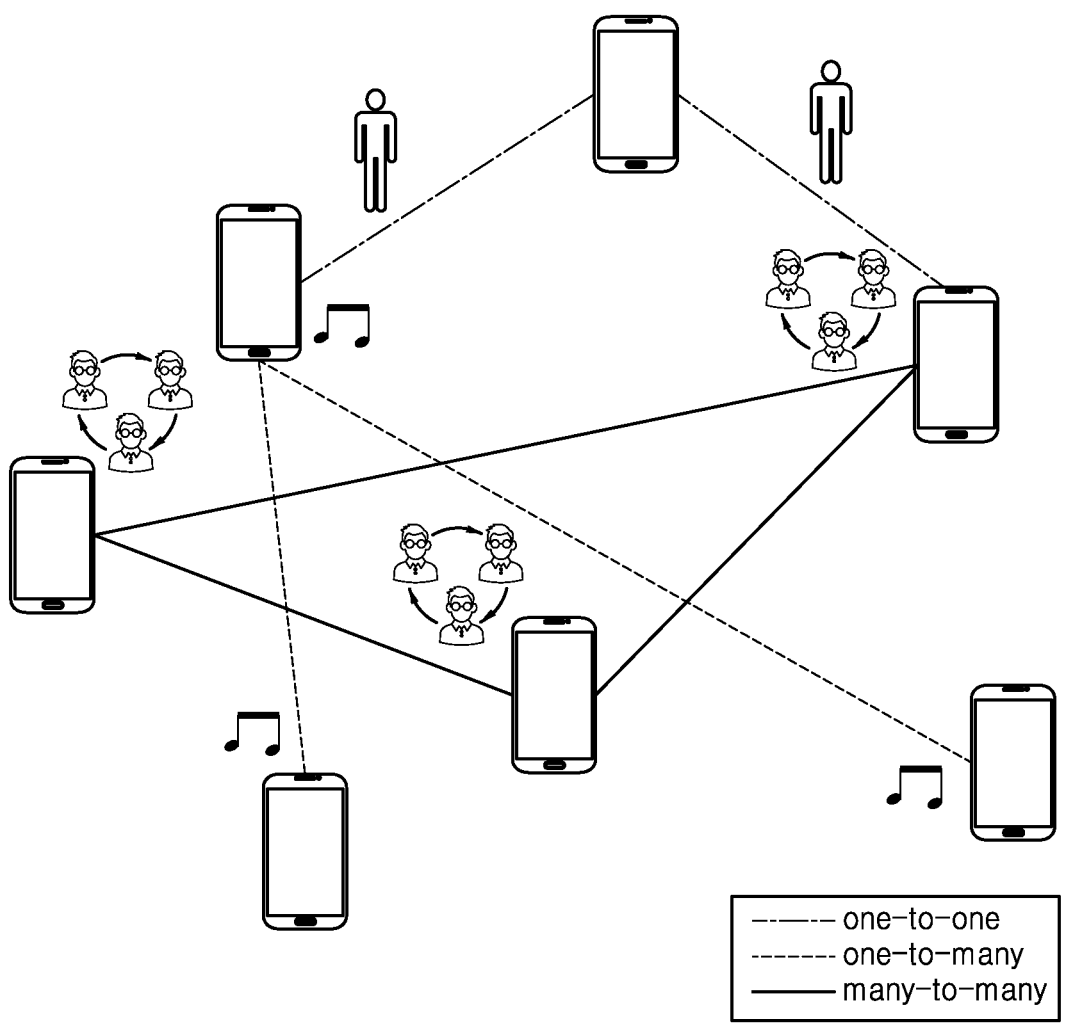
FIG. 1 is a diagram for describing a common device-to-device (D2D) communication procedure.

According to an embodiment of the disclosure, a method of operating an electronic device to perform ranging using ultra wideband (UWB) in a wireless communication system includes: broadcasting or multicasting a first message to start the ranging; and transmitting a third message, based on whether a second message to respond to the first message is received within a predetermined period from another electronic device having received the first message.

According to an embodiment of the disclosure, an electronic device for performing ranging using UWB in a wireless communication system includes: at least one transceiver; at least one memory storing a program; and at least one processor configured to carry out the program to broadcast or multicast a first message to start the ranging; and transmit a third message, based on whether a second message to respond to the first message is received within a predetermined period from another electronic device having received the first message.

Mode of Disclosure

Embodiments of the disclosure will now be described with reference to accompanying drawings to assist those of ordinary skill in the art in readily implementing them. However, the embodiments of the disclosure may be implemented in many different forms, and not limited thereto as will be discussed herein. In the drawings, parts unrelated to the description are omitted for clarity, and like numerals refer to like elements throughout the specification.

The terms are selected as common terms widely used now, taking into account principles of the disclosure, which may however depend on intentions of those of ordinary skill in the art, judicial precedents, emergence of new technologies, and the like. Therefore, the terms should not only be construed by their names, but should be defined based on their meanings and descriptions throughout the disclosure.

Terms like 'first', 'second', etc., may be used to indicate various components, but the components should not be restricted by the terms. These terms are used to distinguish one element, component, region, layer or section from another region, layer or section.

The terminology as used herein is only used for describing particular embodiments of the disclosure and not intended to limit the disclosure. It is to be understood that a singular expression include plural expressions unless the context clearly dictates otherwise. When A is expressed to "be connected" to B, it means to be "directly connected" to B or "electrically connected" to B with C located between A and C. The term "include (or including)" or "comprise (or comprising)" is inclusive or open-ended and does not exclude additional, unrecited elements or method steps, unless otherwise mentioned.

Throughout the specification, "the" and the similar term are used to denote a thing or things already mentioned or assumed to be common knowledge. Operations for describing a method according to the disclosure may be performed in a suitable order unless the context clearly dictates otherwise. The disclosure is not, however, limited to the described order of the operations.

Expressions such as 'in some embodiments' or 'in an embodiment' mentioned throughout the specification are not intended to indicate the same embodiment.

An embodiment of the disclosure may be described in terms of functional block elements and various processing operations. Some or all of the functional blocks may be implemented by any number of hardware and/or software components configured to perform the specified functions. For example, the functional blocks may be implemented by one or more microprocessors or circuit elements having dedicated functions. Furthermore, for example, the functional blocks may be implemented in various programing or scripting languages. The functional blocks may be implemented in algorithms executed on one or more processors. Moreover, the disclosure may employ any number of conventional techniques for electronic configuration, signal processing and/or data processing. The words "mechanism", "element", "means", and "configuration" are used broadly and are not limited to mechanical or physical embodiments, but can include software routines in conjunction with processors, etc.

Connecting lines or members between the elements illustrated in the accompanying drawings are illustratively shown as functional and/or physical connections or circuit connections. In practice, functional, physical, or circuit connections that may be replaced or added may be employed between the elements.

In general, wireless sensor network technologies are classified largely into wireless local area network (WLAN) technologies and wireless personal area network (WPAN) technologies based on recognition ranges. The WLAN is an IEEE 802.11 based technology that is able to access a backbone network within around 100 meters (m). The WPAN is an IEEE 802.15 based technology, including Bluetooth, Zigbee, ultra wideband (UWB), etc. A wireless sensor network having such wireless sensor network technologies implemented therein includes multiple electronic communication devices. The multiple electronic communication devices perform communication in a single channel in an active period. Specifically, the electronic communication devices may collect packets and transmit collected packets in the active period.

UWB may refer to a short-range high-rate wireless communication technology that uses a frequency band equal to or greater than a few GHz, low spectrum density and short pulse width (1 to 4 nsec) in a baseband state. UWB may also refer to a band itself to which UWB communication is applied. A communication method of electronic devices will now be described on a UWB basis, but it is merely an example and may be applied to various wireless communication technologies in practice.

The electronic devices according to embodiments of the disclosure may include portable phones, smart phones, mobile terminals, laptop computers, digital broadcast terminals, personal digital assistants (PDAs), portable multimedia players (PMPs), navigations, slate personal computers (slate PCs), tablet PCs, ultrabooks, telematics terminals, digital televisions (digital TVs), desktop computers, refrigerators, projectors, vehicles, smart cars, printers, etc.

The disclosure will now be described with reference to accompanying drawings.

FIG. 1 is a diagram for describing a common device-to-device (D2D) communication procedure.

D2D communication refers to a method in which geographically adjacent electronic devices perform direct communication without going through an infrastructure such as a base station. The D2D communication may use an unlicensed frequency band, such as Wi-Fi direct or Bluetooth. Alternatively, the D2D communication may use a licensed frequency band to increase frequency usage efficiency of a cellular system. The D2D communication is limitedly used as a term that refers to communication between things or machine to machine (M2M) communication, but the D2D communication of the disclosure may include any communication not only between simple devices equipped with communication functions but also between various types of devices equipped with communication functions such as smart phones or PCs.

Figure 2:
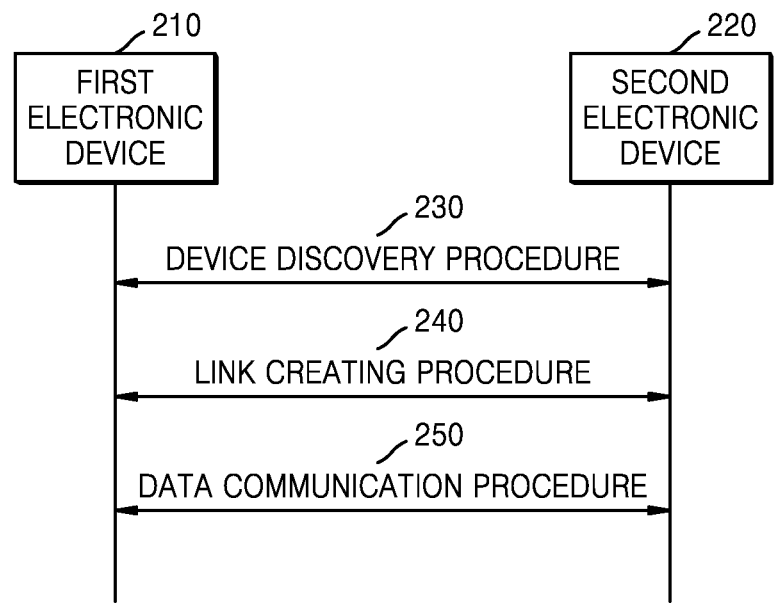
FIG. 2 illustrates a communication procedure between a plurality of electronic devices.

FIG. 2 illustrates a communication procedure between a plurality of electronic devices.

A first electronic device 210 and a second electronic device 220 may communicate with each other through a device discovery procedure 230, a link creation procedure 240, and a data communication procedure 250.

In the device discovery procedure 230, the first electronic device 210 and the second electronic device 220 may each discover other electronic devices available for D2D communication among its neighboring electronic devices. With this, the first electronic device 210 and the second electronic device 220 may each determine whether to create a link for D2D communication. For example, the first electronic device 210 may transmit a discovery signal for the second electronic device 220 to discover the first electronic device 210. Furthermore, the first electronic device 210 may receive a discovery signal transmitted by the second electronic device 220 and determine that other electronic devices available for D2D communication are within a D2D communication range.

In the link creation procedure 240, the first electronic device 210 and the second electronic device 220 may each create a link for data transmission with an electronic device among the electronic devices discovered in the device discovery procedure 230, which intends to transmit data. For example, the first electronic device 210 may create a link for data transmission with the second electronic device 220 discovered in the device discovery procedure 230.

In the data communication procedure 250, the first electronic device 210 and the second electronic device 220 may each transmit or receive data to or from devices with which the link is created in the link creation procedure 240. For example, the first electronic device 210 may transmit or receive data to or from the second electronic device 220 on a link created in the link creation procedure 240. The first electronic device 210 may be referred to as an initiator and the second electronic device 220 may be referred to as a responder.

Figure 3:
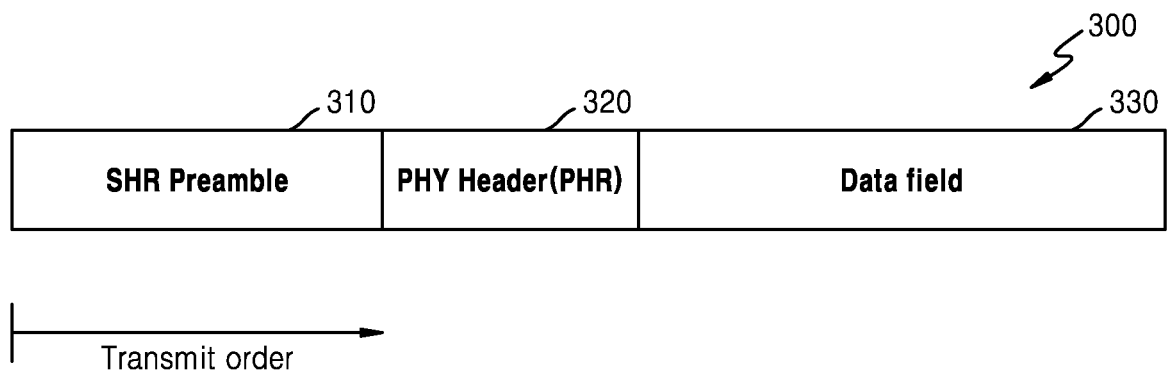
FIG. 3 illustrates an ultra wideband (UWB) physical (PHY) frame structure.

FIG. 3 illustrates a UWB physical (PHY) frame structure.

A UWB PHY frame 300 may include a synchronization header (SHR) preamble 310, a PHY header (PHR) 320 and a data field 330.

The SHR preamble 310 may be used for automatic gain control (AGC), signal acquisition, frequency offset estimation, packet synchronization, channel estimation, and ranging in particular. Specifically, the SHR preamble 310 may be added before the PHR 320 for an algorithm of a receiver related to leading-edge signal tracking for AGC setting, antenna diversity selection, timing acquisition, frequency recovery, packet and frame synchronization, channel estimation, and ranging. The SHR preamble 310 may be referred to as a preamble code.

The PHR 320 may include information about content of a PHY protocol data unit (PPDU) and a protocol used to transmit the PPDU.

The data field 330 may include data for transmission or data received.

In the UWB communication, the SHR preamble may be transmitted in a leading portion of the frame, in order to obtain synchronization between the transmitter and the receiver. The SHR preamble may be a signal agreed between the transmitter and the receiver. The SHR preamble may be determined so that the transmitter and the receiver may be quickly synchronized through a starting point of the frame in the wireless communication system. Although the UWB PHY frame structure is shown in FIG. 3, the UWB PHY frame structure according to various embodiments of the disclosure is not limited to what is shown in FIG. 3.

Various embodiments of the disclosure relate to medium access control (MAC), and a technology to avoid collision between electronic devices when packets are exchanged in a MAC process for UWB may be discussed. For the UWB MAC, a distance between electronic devices needs to be estimated. In this case, a ranging technology may be used to estimate the distance between electronic devices. A UWB based ranging technology may use a wide band as compared to Wi-Fi, Bluetooth, Bluetooth low energy (BLE), and ultrasound based distance estimation technologies, so it may provide high accuracy. For example, the UWB based ranging technology may provide accuracy with about ±10 cm error. On the other hand, the Wi-Fi based distance measurement technology may provide accuracy with about ±1 m error. In general, when the UWB based ranging technology is always activated, it may accelerate energy consumption of a battery of a mobile device, so the UWB based ranging technology is not always activated but may be activated or deactivated when needed by the user. For example, in a door open/close scenario, the user may not always be located close to the door, so when the user approaches the door to go out or come in, a distance between a mobile device and an electronic device embedded in the door may be measured without intervention from the user. When the measured distance between the electronic devices satisfies a threshold, a locking device installed in the door may be locked or unlocked. In the above door open/close scenario, a UWB activation technique by the user or using an out-of-band technology (e.g., BLE) may be required. Like the aforementioned scenario, when UWB of electronic devices is temporarily activated as needed to perform distance estimation, the electronic devices do not continuously participate in the UWB network for monitoring but may usually require scanning for a certain period of time. When the scanning period is long, the distance estimation may be started later than a needed point in time due to the scanning. On the other hand, when the scanning period is short, the electronic device has difficulty in determining whether the wireless communication channel is currently occupied, and may thus transmit a packet for distance estimation during packet exchange between adjacent electronic devices. Hence, the electronic device may fail to estimate the distance. Furthermore, the UWB technology may have transmit power similar to or lower than noise because the signal spreads over a wide band. For that reason, a method of determining based on energy detection whether a wireless communication channel is occupied as in Wi-Fi may not be used. Hence, in the scenario of performing the UWB based ranging technology, a minimum scanning period may be used to determine whether a channel is occupied. Furthermore, information obtained by packet decoding instead of energy detection may be used to determine whether a wireless communication channel is occupied. This may avoid collision between packets transmitted by different electronic devices in the same wireless communication channel.

A single-sided two way (SS-TWR) ranging technology will now be described as a UWB based ranging technology in connection with FIGS. 4 and 5.

Figure 4:
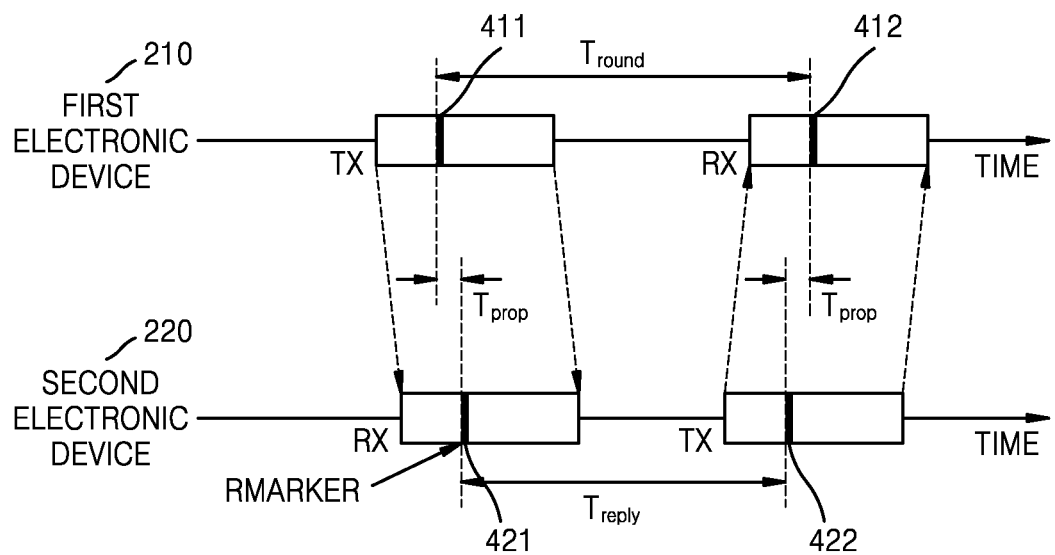
FIG. 4 is a diagram for schematically describing single-sided two-way (SS-TWR) ranging operations of electronic devices.

FIG. 4 is a sequence diagram for schematically describing SS-TWR ranging operations of electronic devices.

Referring to FIG. 4, RMARKER may refer to information in a frame for defining a reference point in time. The electronic device may measure a time interval based on the RMARKER.

The first electronic device 210 may start ranging by transmitting (TX) a ranging frame (poll) including a ranging request reply time (RRRT) information element (IE) to the second electronic device 220. Upon reception of the ranging frame, the second electronic device 220 may transmit a ranging frame (response) including a ranging reply time instantaneous (RRTI) IE including $T_{reply}$ information to the first electronic device 210.

Specifically, the first electronic device 210 may measure a time between RMARKER 1-1 411 included in the frame transmitted to the second electronic device 220 and RMARKER 1-2 412 included in the frame received (RX) from the second electronic device 220 as $T_{round}$. The second electronic device 220 may measure a time between RMARKER 2-1 421 included in the frame received from the first electronic device 210 and RMARKER 2-2 422 included in the frame transmitted to the first electronic device 210 as $T_{reply}$. The time $T_{prop}$ which is a time of flight (ToF) may be calculated in following Equation 1:

$$\hat{T}_{prop} = \frac{1}{2}(T_{round} - T_{reply}) \quad \text{[Equation 1]}$$

In Equation 1, $T_{round}$ denotes a time between RMARKER 1-1 411 and RMARKER 1-2 412, and $T_{reply}$ denotes a time between RMARKER 2-1 421 and RMARKER 2-2 422. The distance between the first electronic device 210 and the second electronic device 220 may be estimated by multiplying $T_{prop}$ calculated in Equation 1 by the speed of light (e.g., $3 \times 10^8$ m/s).

Figure 5:
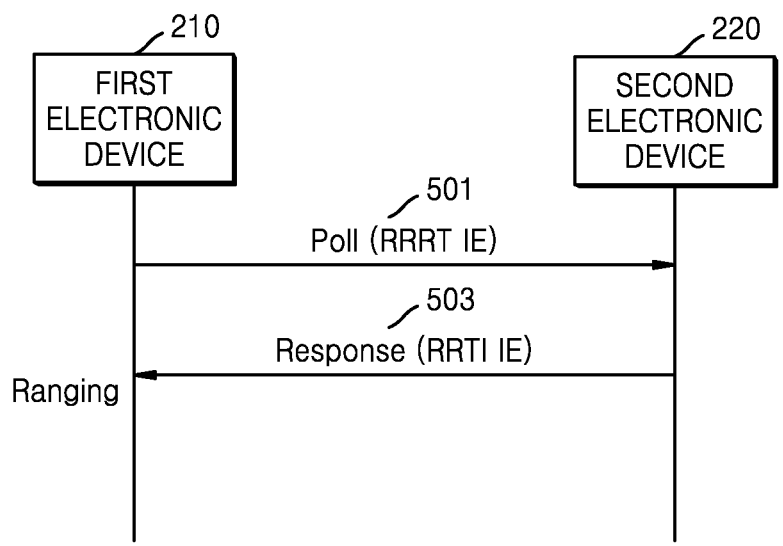
FIG. 5 is a sequence diagram for schematically describing SS-TWR ranging operations of electronic devices.

FIG. 5 is a sequence diagram for schematically describing SS-TWR ranging operations of electronic devices.

Referring to FIG. 5, in operation 501, the first electronic device 210 may transmit a ranging frame (poll) including an RRRT IE, which is an IE for requesting $T_{reply}$, to the second electronic device 220. With this transmission, ranging operation may be started (ranging poll).

In operation 503, the second electronic device 220 may transmit a ranging frame (response) including an RRTI IE for providing $T_{reply}$, to the first electronic device 210. In this case, the first electronic device 210 may measure a time $T_{round}$ between RMARKER included in the ranging frame transmitted to the second electronic device 220 and RMARKER included in the ranging frame received from the second electronic device 220. Furthermore, the second electronic device 220 may measure a time $T_{reply}$ between RMARKER included in the ranging frame received from the first electronic device 210 and RMARKER included in the ranging frame transmitted to the first electronic device 210.

A double-sided two way (DS-TWR) ranging technology will now be described as a UWB based ranging technology in connection with FIGS. 6 and 7. Hereinafter, a ranging frame may be referred to as a frame, a packet, or a ranging message. Furthermore, poll may be referred to as one of a poll packet and a poll message. Response may be referred to as one of a response packet and a response message.

Figure 6:
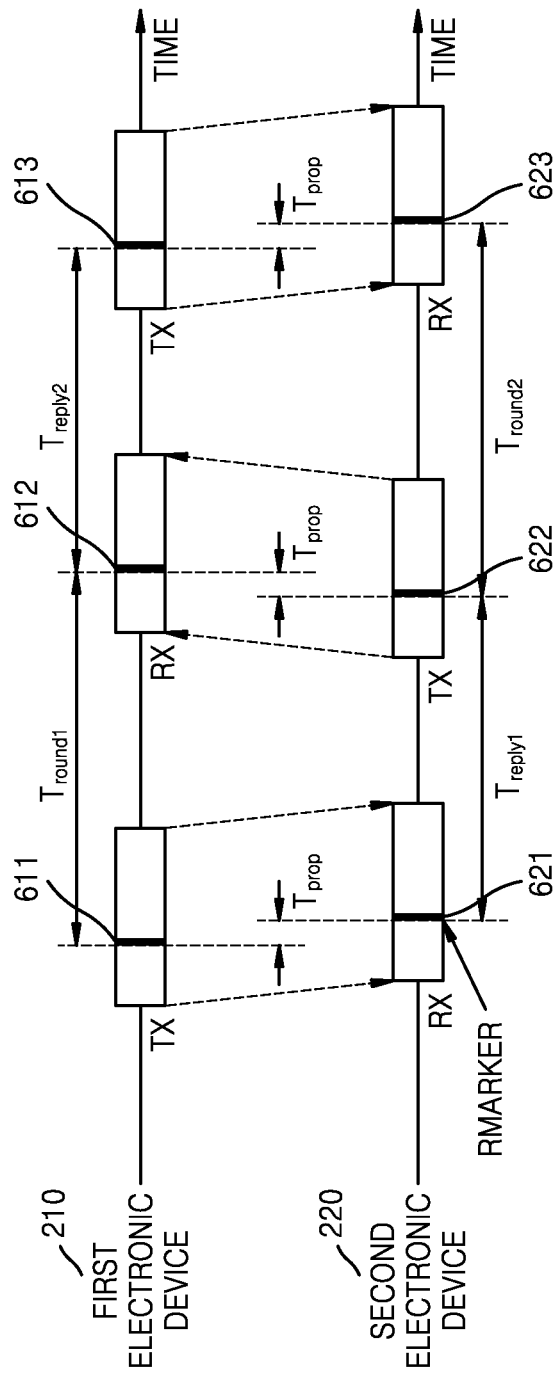
FIG. 6 is a diagram for schematically describing double-sided two-way (DS-TWR) ranging operations of electronic devices.

FIG. 6 is a diagram for schematically describing DS-TWR ranging operations of electronic devices.

Referring to FIG. 6, RMARKER may refer to data in a frame for defining a reference point in time. The electronic device may measure a time interval based on the RMARKER.

The first electronic device 210 may begin ranging by transmitting a ranging frame (poll) including a ranging control double-sided two-way ranging (RCDT) IE with a value of 0 to the second electronic device 220. Upon receiving the ranging frame, the second electronic device 220 may transmit a ranging frame (response) as a response including an RCDT(2) IE with a value of 2 and an RRRT IE to the first electronic device 210. In this case, the second electronic device 220 may measure $T_{reply1}$. Upon reception of the ranging frame as a response, the first electronic device 210 may transmit a ranging frame (the second poll) containing an RRTI IE including $T_{reply2}$ and a ranging round trip measurement (RRTM) IE including $T_{round1}$ to the second electronic device 220. When receiving this, the second electronic device 220 may measure a value of $T_{round2}$.

Specifically, the first electronic device 210 may measure a time between RMARKER 1-1 611 included in the frame transmitted to the second electronic device 220 and RMARKER 1-2 612 included in the frame received from the second electronic device 220 as $T_{round1}$.

The second electronic device 220 may measure a time between RMARKER 2-1 621 included in the frame received from the first electronic device 210 and RMARKER 2-2 622 included in the frame transmitted to the first electronic device 210 as $T_{reply1}$.

The first electronic device 210 may measure a time between RMARKER 1-2 612 included in the frame received from the second electronic device 220 and RMARKER 1-3 613 included in the frame transmitted to the second electronic device 220 as $T_{reply2}$.

The second electronic device 220 may measure a time between RMARKER 2-2 622 included in the frame transmitted to the first electronic device 210 and RMARKER 2-3 623 included in the frame received from the first electronic device 210 as $T_{round2}$. The time $T_{prop}$ which is a time of ToF may be calculated in following Equation 2:

$$\hat{T}_{prop} = \frac{(T_{round1} \times T_{round2} - T_{reply1} \times T_{reply2})}{(T_{round1} + T_{round2} + T_{reply1} + T_{reply2})} \quad \text{[Equation 2]}$$

In Equation 2, $T_{round1}$ denotes a time between RMARKER 1-1 611 and RMARKER 1-2 612, $T_{reply1}$ denotes a time between RMARKER 2-1 621 and RMARKER 2-2 622, $T_{reply2}$ denotes a time between RMARKER 1-2 612 and RMARKER 1-3 613, and $T_{round2}$ denotes a time between RMARKER 2-2 622 and RMARKER 2-3 623. The distance between the first electronic device 210 and the second electronic device 220 may be estimated by multiplying $T_{prop}$ calculated in Equation 2 by the speed of light (e.g., $3 \times 10^8$ m/s).

Figure 7:
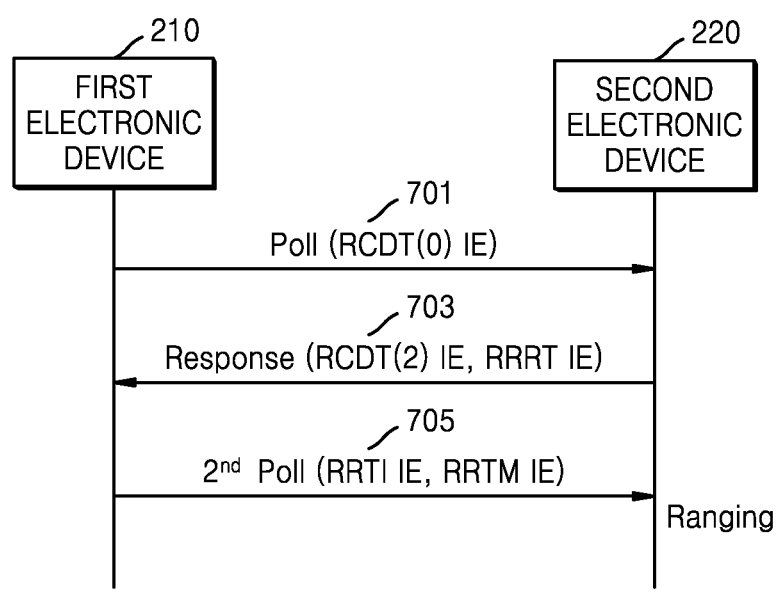
FIG. 7 is a sequence diagram for schematically describing DS-TWR ranging operations of electronic devices.

FIG. 7 is a sequence diagram for schematically describing DS-TWR ranging operations of electronic devices.

Referring to FIG. 7, in operation 701, the first electronic device 210 may transmit a ranging frame (poll) including an RCDT(0) IE to the second electronic device 220. With this, ranging operation may be started (ranging poll).

In operation 703, the second electronic device 220 may transmit a ranging frame (response) including an RCDT(2) IE and an RRRT IE to the first electronic device 210. In this case, the second electronic device 220 may measure $T_{reply1}$. As described above, $T_{reply1}$ may refer to a time between RMARKER included in the ranging frame received from the first electronic device 210 and RMARKER included in the ranging frame transmitted (TX) to the first electronic device

210. For $T_{reply2}$, $T_{round1}$ and $T_{round2}$, the time interval measurement principles as described in connection with FIG. 6 may be equally applied.

In operation 705, the first electronic device 210 may transmit a ranging frame including an RRTI IE ($T_{reply2}$) and an RRTM IE ($T_{round1}$), which are time stamp information, to the second electronic device 220 (ranging final).

Control information values of the RCDT IE and corresponding meanings are as in the following table 1.

TABLE 1

| control information value | meaning |
|---|---|
| 0 | This frame is initiating DS-TWR and indicates that the initiating end does not require the ranging result |
| 1 | This frame is initiating DS-TWR and requesting that the ranging result is sent back at end of exchange |
| 2 | This frame is continuing the DS-TWR, forming the request for the $2^{nd}$ TX-to-RX round-trip measurement |

A DW-TWR ranging based multicast or broadcast ranging technology will now be described in connection with FIG. 8.

Figure 8:
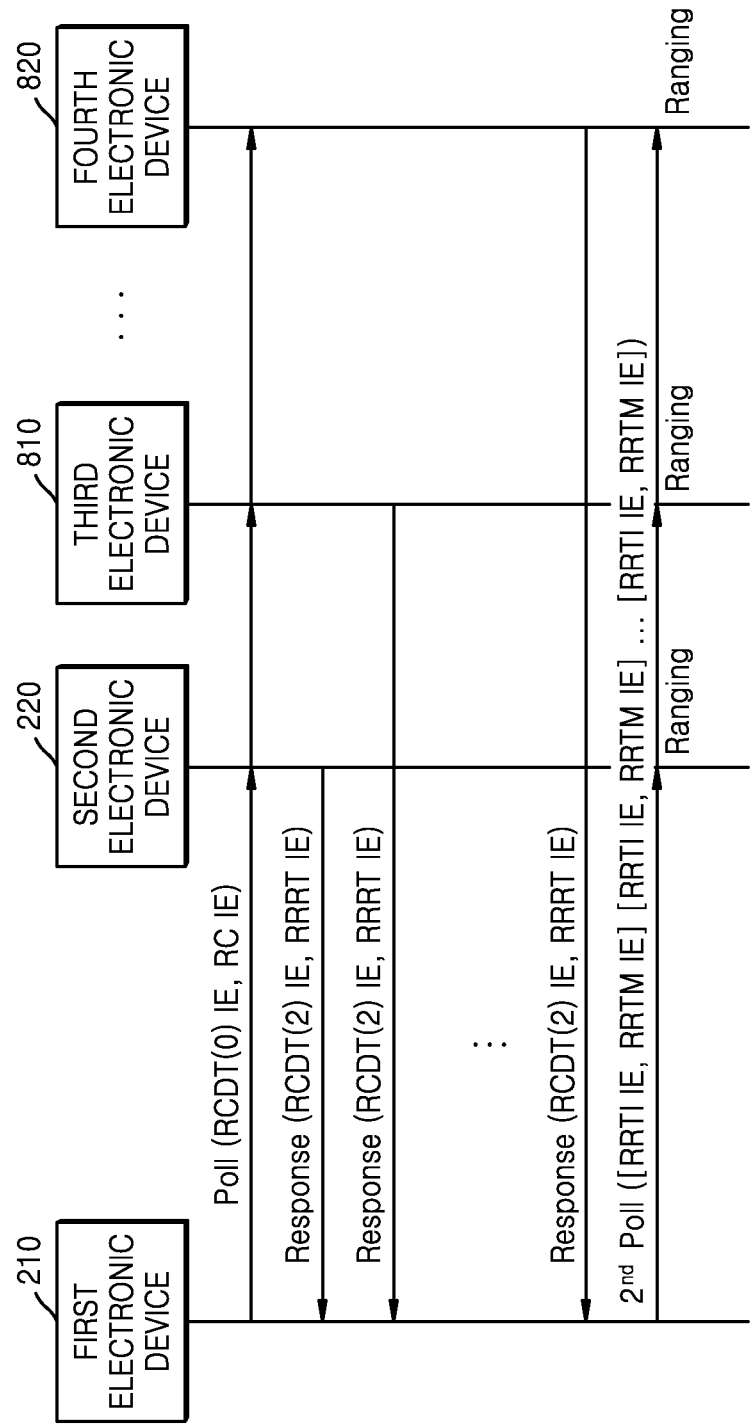
FIG. 8 is a diagram illustrating a DW-TWR ranging procedure of electronic devices.

FIG. 8 is a diagram illustrating a DW-TWR ranging procedure of electronic devices.

Referring to FIG. 8, the first electronic device 210 may transmit a ranging message poll to each of the second electronic device 220, a third electronic device 810, and an N-th electronic device 820. The ranging message poll may include an RCDT(0) IE and a ranging control (RC) IE. The RC IE is an IE to control a multicast ranging procedure, and may include a field indicating a ranging type (e.g., unicast, multicast-scheduled, multicast-contention, and broadcast), a group ID or device ID list field for entities to be ranged (e.g., device B, device C, . . . , device N), a field indicating the number of time slots for receiving a response message, a field indicating a length of time slots for receiving a response, etc. When the RC IE indicates multicast-scheduled, multicast-contention or broadcast instead of unicast, a plurality of electronic devices may transmit response messages to the electronic device that has transmitted poll. When the RC IE includes a group ID or device ID list field as for multicast-scheduled or multicast-contention, the entity to transmit the response message may be limited to some of the electronic devices unlike the broadcast case. For example, in the multicast-scheduled case, electronic devices to transmit the response message may be limited to electric devices contained in the device ID list included in poll. In this case, the number of time slots in the RC IE may be equal to the number of electronic devices contained in the device ID list. In this case, the electronic devices may transmit response messages in the respective slots sequentially (e.g., in an order of being contained in the device ID list). In the multicast-contention case, electronic devices to transmit the response message may be limited to electric devices contained in the group ID list included in poll. In this case, the number of time slots in the RC IE may be randomly determined by the electronic device that transmits poll. In this case, the electronic devices may each select a slot at random and transmit a response message in the selected slot. Furthermore, in the broadcast case, electronic devices to transmit response messages may not be specified. In this case, the number of time slots in the RC IE may be randomly determined by the electronic device that transmits poll. In this case, the electronic devices may each select a slot at random and transmit a response message in the selected slot.

The second electronic device 220, the third electronic device 810 and the N-th electronic device 820 may each transmit a ranging message (response) including an RCDT(2) IE and an RRRT IE to the first electronic device 210. The first electronic device 210 may transmit a ranging frame including an RRTI IE ($T_{reply2}$) and an RRTM IE ($T_{round1}$), which are time stamp information, to each of the second electronic device 220, the third electronic device 810 and the fourth electronic device 820 (ranging final or the second poll). In this case, the second poll may include a plurality of RRTI IEs and RRTM IEs. In a case of exchanging packets for UWB ranging, multiple methods may be considered to avoid collision between electronic devices. For example, a contention-free access method using a synchronized superframe as shown in FIG. 9 may be used.

Figure 9:
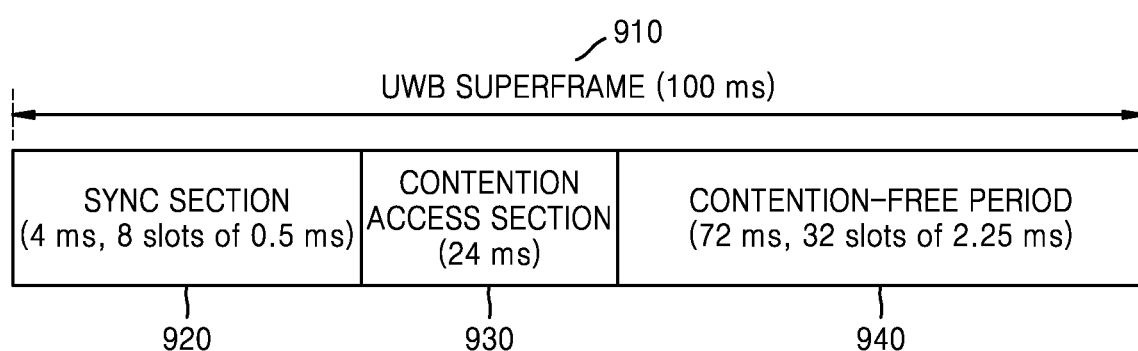
FIG. 9 illustrates a UWB superframe structure.

FIG. 9 illustrates a UWB superframe structure.

Referring to FIG. 9, a superframe 910 may include a sync section 920, a contention access section (CAP) 930 and a contention-free period (CFP) 940. The sync section 920 and the CFP section 940 may include slots of certain time lengths. For example, the sync section 920 may include 8 slots each having 0.5 ms long. The CFP section 940 may include 32 slots each having 2.25 ms long. The electronic devices may transmit sync packets in the sync section 920, and starting points of the superframes may be synchronized between the electronic devices through the sync packets transmitted. Furthermore, the electronic devices may determine slots to be used in the CFP 940 through CFP usage information included in the sync packets. When UWB is activated, the electronic devices may be synchronized with a network by receiving as many sync packets as the number of certain superframes. Moreover, the electronic devices may determine slots to be used in the CFP 940 by transmitting and receiving sync packets. The electronic devices may determine or obtain slots of the CFP 940 in the sync section 920, and then perform distance estimation. When the aforementioned superframe is used, it is assumed that the electronic devices continuously perform sync packet transmission and reception. Hence, it may not be suitable for a UWB ranging scenario including mobile devices. When the aforementioned superframe is used in the UWB ranging scenario, network scanning for UWB may be time- and energy-consuming, so the distance estimation may be delayed or failed. This may accelerate battery consumption of the mobile device.

In a case of exchanging packets for UWB ranging, an energy detection method may be considered to avoid collision between electronic devices. For example, when energy equal to or greater than a certain threshold is detected through the energy detection, the electronic device may not try packet transmission for ranging. However, in the case of UWB, signals spread across a wide frequency band and transmit power similar to or lower than noise is used, so it may not be easy for the electronic device to detect energy equal to or greater than the threshold. Hence, the energy detection method may not be suitable for a UWB environment.

In a case of exchanging packets for UWB ranging, multiple methods may be considered to avoid collision between electronic devices. For example, for the collision avoidance method, duration information included in a packet for ranging may be used. Specifically, information relating to duration may be included in a packet for ranging transmitted by the electronic device. With this, a time for which the electronic device is expected to occupy a channel may be calculated by another electronic device having received the packet. In this case, the time calculated with the information relating to the duration may refer to a network allocation vector (NAV) value, and the other electronic device may not transmit a packet for ranging for a time as long as the NAV value. The electronic device does not perform energy detection for a time as long as the NAV value, so sleep mode or transmission and reception deactivation may be used to reduce energy consumption. A method of avoiding collision by configuring the NAV will now be described in connection with FIGS. 10 and 11.

Figure 10:
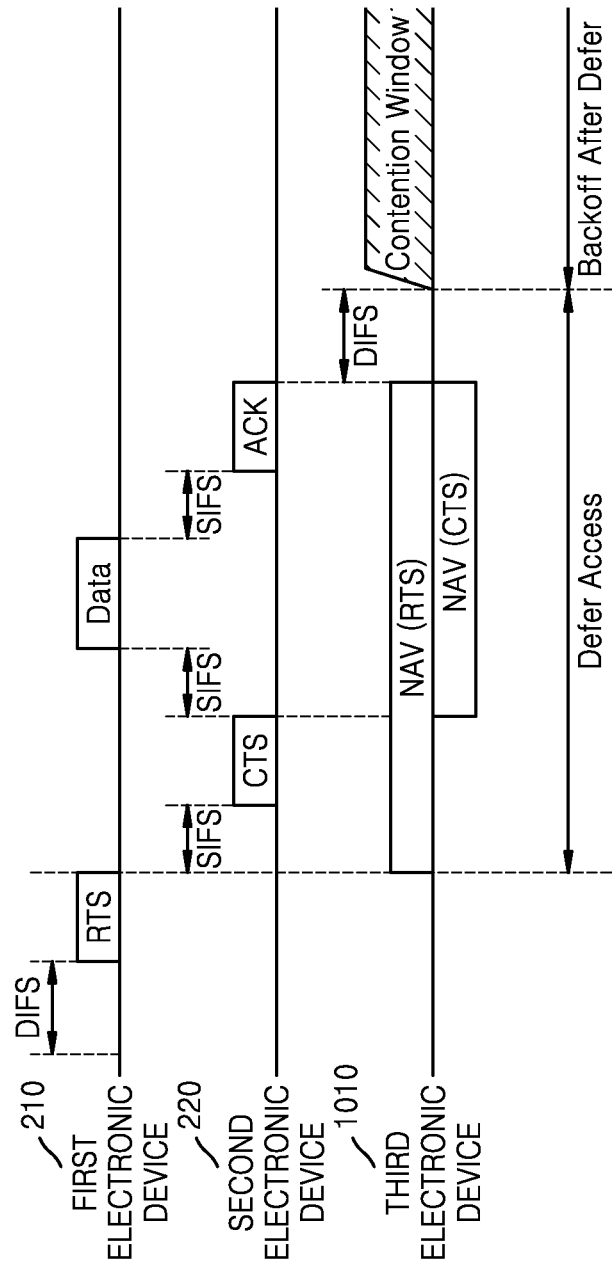
FIG. 10 is a diagram illustrating a procedure of configuring a network allocation vector (NAV) based on ready to send (RTS) and clear to send (CTS).

FIG. 10 is a diagram illustrating a procedure of configuring a NAV based on ready to send (RTS) and clear to send (CTS).

Referring to FIG. 10, the first electronic device 210 and the second electronic device 220 may exchange the RTS and CTS to occupy a channel. In this case, duration information in an RTS packet may include information relating to a period required to transmit CTS, data, acknowledgment (ACK). A third electronic device 1010 having received a CTS packet may configure or update a NAV using the duration information in the CTS packet. The third electronic device 1010 may not perform packet transmission for ranging for a period as long as the NAV value.

Figure 11:
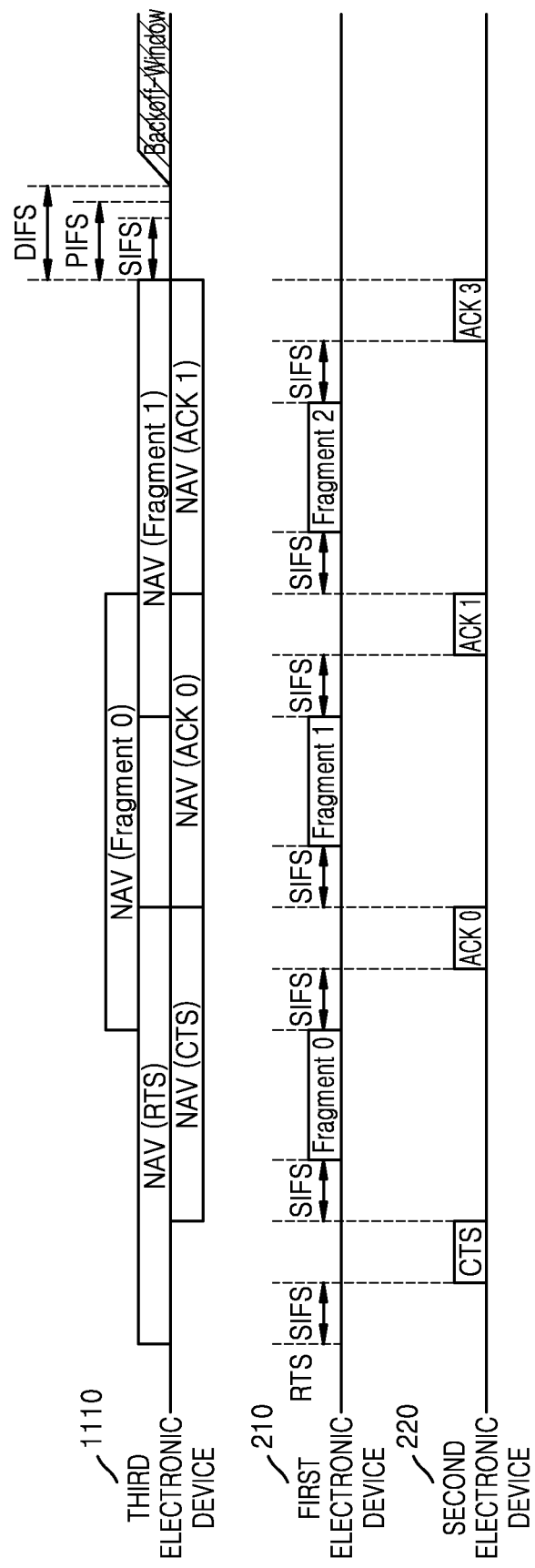
FIG. 11 is a diagram illustrating a procedure of configuring a NAV based on RTS, CTS, data, and acknowledgment (ACK).

FIG. 11 is a diagram illustrating a procedure of configuring a NAV based on RTS, CTS, data, and acknowledgment (ACK).

In FIG. 11, shown is an example in which a NAV is continuously updated using duration information included in data fragmented and transmitted (Fragments 0 to 2) and duration information included in ACK. Referring to FIG. 11, the first electronic device 210 and the second electronic device 220 may exchange the RTS and CTS to occupy a channel. Furthermore, the first electronic device 210 may multicast or broadcast Fragments 0 to 2 as data. In this case, duration of the Fragment 0 packet may include information relating to a time required to transmit ACK, Fragment 1, and ACK. ACK for the Fragment 0 packet may include information relating to a time required to transmit Fragment 1 and ACK. The third electronic device 1110 may update the NAV using the Fragment packet received from the first electronic device 210 and ACK received from the second electronic device 220. The third electronic device 1110 may not perform packet transmission for ranging for a period as long as the updated NAV value.

When UWB ranging is performed and even the information relating to the duration is contained in all the ranging packets, ranging packets are not exchanged between the electronic devices for a certain period of time, so the ranging packets may collide with each other. An example of a collision occurring between the ranging packets will be described in connection with FIG. 12.

Figure 12:
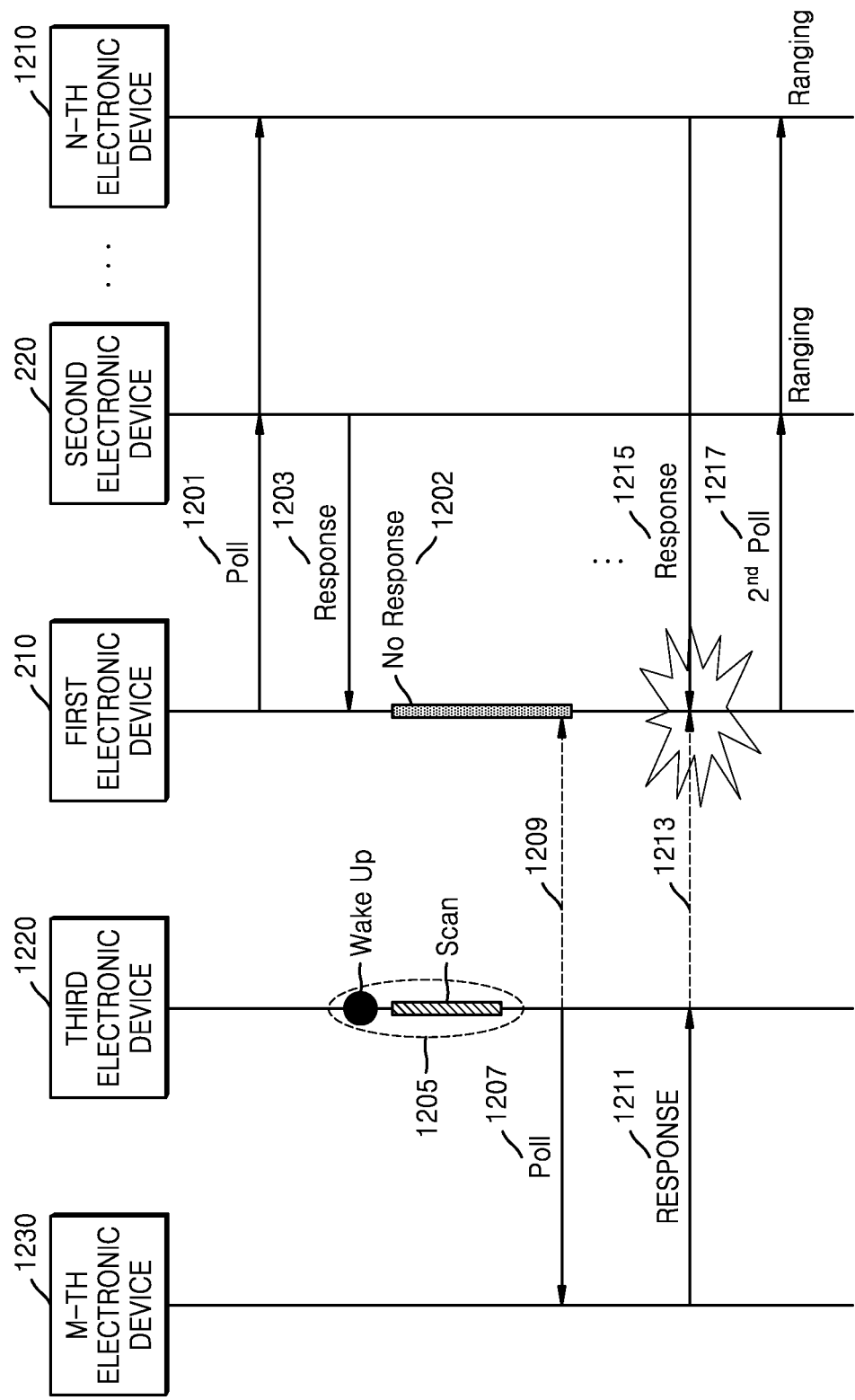
FIG. 12 is a diagram illustrating a condition where a collision occurs while electronic devices are operating, according to embodiments of the disclosure.

FIG. 12 is a diagram illustrating a condition where a collision occurs while electronic devices are operating, according to embodiments of the disclosure.

Referring to FIG. 12, in operation 1201, the first electronic device 210 may transmit a poll packet to perform ranging with the second electronic device 220 and an N-th electronic device 1210. With this, ranging operation may be started. In various embodiments, the poll packet may be broadcast or multicast.

In operation 1203, the second electronic device 220 may transmit a response packet to the first electronic device 210.

In operation 1205, a third electronic device 1220 may be activated (or woken up) and may scan a channel. Specifically, while the electronic devices (e.g., the second electronic device 220 and the N-th electronic device 1210) which perform ranging with the first electronic device 210 are not transmitting the response packet to the first electronic device 210 for a certain time, the third electronic device 1220 may be activated. For example, in FIG. 12, the first electronic device 210 may receive a response packet from the second electronic device 220 but not from the N-th electronic device 1210 for a first set period 1202. The activated third electronic device 1220 may scan a channel for UWB ranging.

In operation 1207, the third electronic device 1220 may transmit a poll packet to an M-th electronic device 1230. No poll packet or response packet is transmitted to the third electronic device 1220 for the first set period 1202, so the activated third electronic device 1220 is unable to know whether other electronic devices perform ranging when the third electronic device 1220 performs channel scanning. Accordingly, after scanning a channel, the third electronic device 1220 may determine that the channel is not occupied and transmit the poll packet to the M-th electronic device 1230. In various embodiments, the poll packet may be broadcast or multicast.

In operation 1209, the first electronic device 210 may receive a poll packet transmitted by the third electronic device 1220. For example, the first electronic device 210 may receive the poll packet transmitted by the third electronic device 1220 to the M-th electronic device 1230.

In operation 1211, the M-th electronic device 1230 may transmit a response packet to the third electronic device 1220. Specifically, the M-th electronic device 1230 may transmit a response packet to the third electronic device 1220 in response to the poll packet transmitted by the third electronic device 1220.

In operation 1213, the first electronic device 210 may detect the response packet transmitted by the M-th electronic device 1230. For example, the first electronic device 210 may receive the response packet transmitted by the M-th electronic device 1230 to the third electronic device 1220.

In operation 1215, the N-th electronic device 1210 may transmit a response packet to the first electronic device 210. Specifically, the N-th electronic device 1210 may transmit a response packet to the first electronic device 210 in response to the poll packet received in operation 1201 from the first electronic device 210. Operations 1213 and 1215 may be performed at the same time. In the case that operations 1213 and 1215 are performed simultaneously, collision may occur in the first electronic device 210 between the response packet transmitted by the M-th electronic device 120 and the response packet transmitted by the N-th electronic device 1210. The collision may refer to an occasion when different electric signals (e.g., the response packet of the M-th electronic device 1230 and the response packet of the N-th electronic device 1210) received by the first electronic device 210 overlap and interfere with each other.

In operation 1217, the first electronic device 210 may transmit the second poll packet to the second electronic device 220 and the N-th electronic device 1210. In other words, the first electronic device 210 may transmit the second poll packet to the second electronic device 220 and the N-th electronic device 1210 in response to the response packets.

In UWB communication, a data decoding method may be used to determine whether a wireless communication channel is occupied, instead of the energy detection method. For example, before exchanging packets for ranging with other electronic device(s), an electronic device may scan a channel during a combined period of a maximum packet duration and a maximum ACK interval time. When receiving a packet, i.e., a preamble symbol or signal, from the other electronic device while scanning a channel, the electronic device may determine that the channel is being occupied. The preamble symbol or signal may refer to a symbol or signal for UWB. When determining that the channel is occupied, the electronic device may not exchange packets for ranging with the other electronic devices. In the aforementioned scenario, continuous channel scanning may be required.

In various embodiments of the disclosure, a method of avoiding collision of packets based on information relating to duration in a UWB based one-to-many (1:N) ranging environment may be provided.

In various embodiments of the disclosure, the superframe may not be used. In other words, operations for continuous synchronization between electronic devices in the UWB network may not be performed.

In various embodiments of the disclosure, an electronic device may determine whether a wireless communication channel is occupied based on data decoding, i.e., whether a preamble symbol or signal is received from other electronic devices. For example, the electronic device may determine whether the channel is occupied through data decoding before transmitting a packet for ranging, and when the channel is not occupied, may transmit the packet to another electronic device. A scanning period for which the electronic device determines whether the channel is occupied may be assumed to be a combined value of a maximum packet duration and a maximum ACK interval time.

In various embodiments of the disclosure, duration information and NAV information may be used. For example, packets exchanged between electronic devices during the ranging procedure may include the duration information. In this case, electronic devices having received the packets for ranging may configure a NAV. This may avoid collision between the electronic devices in a one-to-one (1:1) UWB ranging procedure. The electronic devices may perform energy saving operations as in sleep mode until the end of the ranging procedure.

Furthermore, in various embodiments of the disclosure, when an electronic device having transmitted poll to start ranging, i.e., an electronic device to receive response messages from multiple electronic devices, has not received the response message from the multiple electronic devices for a certain period of time, the electronic device may transmit a packet indicating that ranging is in progress. The packet may include information relating to duration to update NAV configurations of adjacent electronic devices, and may be transmitted to other electronic devices. Furthermore, the packet may be referred to as intermediate poll to be distinguished from the traditional packet name, and may be configured even with a packet such as poll, data, ACK, response, etc. In the following, intermediate poll, an intermediate poll message, an intermediate poll packet, etc., may refer to ACK. A destination address of the aforementioned packet may be comprised of an address of an electronic device to which the packet is to be transmitted. In connection with FIG. 13, an embodiment of performing ranging operations between electronic devices with intermediate poll will be described.

Figure 13:
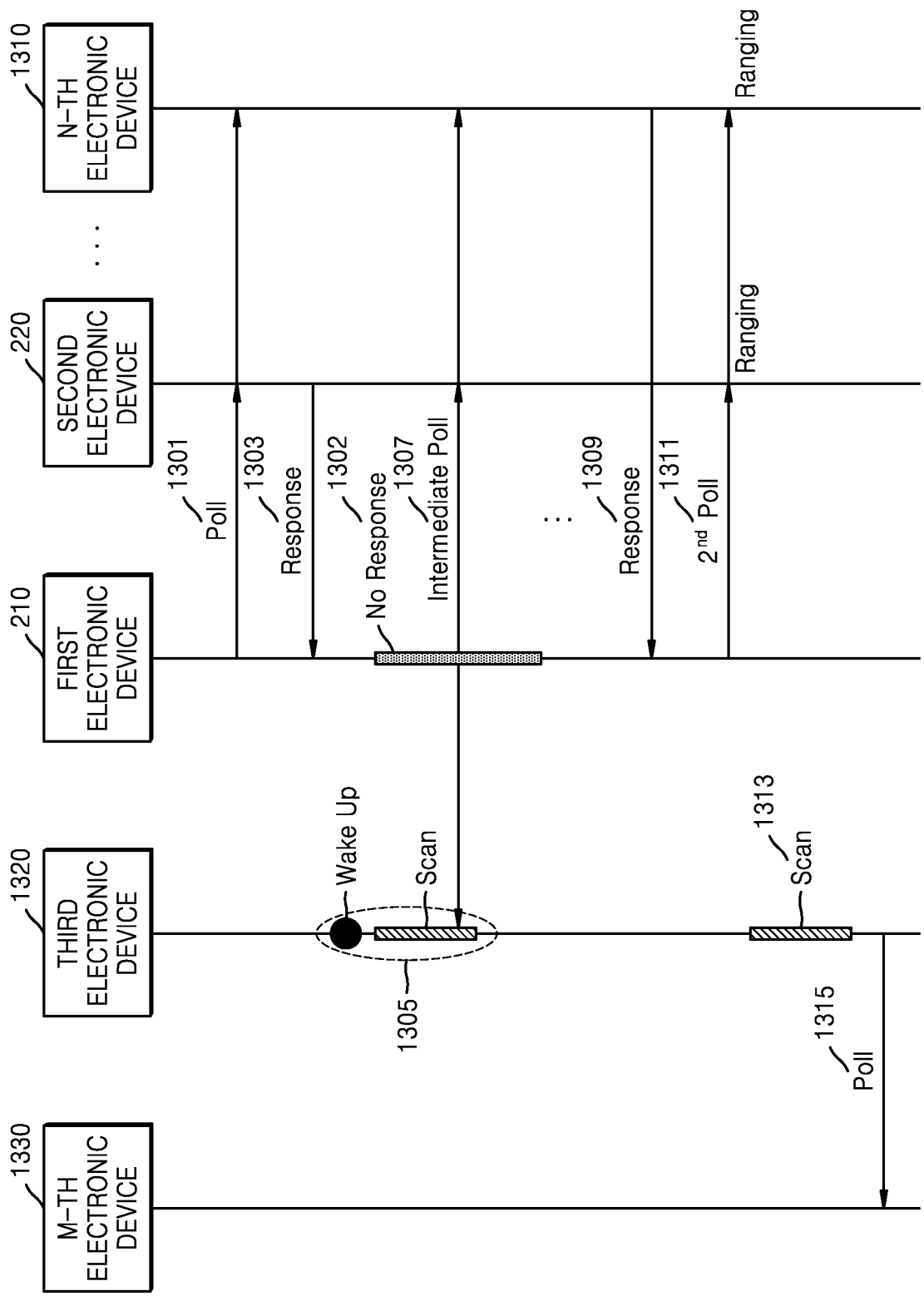
FIG. 13 is a diagram illustrating a condition where no collision occurs while electronic devices are operating, according to embodiments of the disclosure.

FIG. 13 is a diagram illustrating a condition where no collision occurs while electronic devices are operating, according to embodiments of the disclosure.

Referring to FIG. 13, in operation 1301, the first electronic device 210 may transmit a poll packet to perform ranging with the second electronic device 220 and an N-th electronic device 1310. With this, ranging operation may be started. In various embodiments, the poll packet may be broadcast or multicast.

In operation 1303, the second electronic device 220 may transmit a response packet to the first electronic device 210.

In operation 1305, a third electronic device 1320 may be activated and may scan a channel. Specifically, while the electronic devices (e.g., the second electronic device 220 and the N-th electronic device 1310) which perform ranging with the first electronic device 210 are not transmitting the response packet to the first electronic device 210 for a certain time, the third electronic device 1320 may be activated. For example, in FIG. 13, the first electronic device 210 may receive a response packet from the second electronic device 220 but not from the N-th electronic device 1310 for a second set period 1302. The activated third electronic device 1320 may scan a channel for UWB ranging.

In operation 1307, the first electronic device 210 may transmit intermediate poll to the second electronic device 220, the N-th electronic device 1310 and the third electronic device 1320. Specifically, when the first electronic device 210 has not received a response packet to the poll packet, from the N-th electronic device 1310 for the second set period 1302, the first electronic device 210 may transmit the intermediate poll packet. With the transmission of the intermediate poll packet, collision from packet transmission or reception between different electronic devices in the UWB channel may be avoided. Upon reception of the intermediate poll packet, the third electronic device 1320 may determine that the channel for ranging is occupied by the first electronic device 210 and may not transmit the poll packet for ranging to the M-th electronic device 1330.

In operation 1309, the N-th electronic device 1310 may transmit a response packet to the first electronic device 210. Specifically, the N-th electronic device 1310 may transmit a response packet in response to the poll packet of the first electronic device 210.

In operation 1311, the first electronic device 210 may transmit the second poll packet to the second electronic device 220 and the N-th electronic device 1310. In other words, the first electronic device 210 may transmit the second poll packet to the second electronic device 220 and the N-th electronic device 1310 in response to the response packets.

In operation 1313, a third electronic device 1320 may scan a channel. Specifically, the third electronic device 1320 may scan a channel for UWB ranging after the ranging procedure between the first, second, and N-th electronic devices 210, 220, and 1310 is completed.

In operation 1315, the third electronic device 1320 may transmit a poll packet to an M-th electronic device 1330. Specifically, after scanning a channel, the third electronic device 1320 may determine that the channel is not occupied and transmit the poll packet to the M-th electronic device 1330. As the ranging procedure between the first, second, and N-th electronic devices 210, 220, and 1310 has already been completed, collision may not occur between the ranging operation between the third electronic device 1320 and the M-th electronic device 1330 and the ranging operation between the first, second, and N-th electronic devices 210, 220, and 1310. For example, a response packet transmitted by the M-th electronic device 1330 to the third electronic device 1320 may not collide with the response packet received by the first electronic device 210 from the N-th electronic device 1310. FIGS. 12 and 13 are described by taking an example of DS-TWR, but may be equally applied to SS-TWR.

Figure 14:
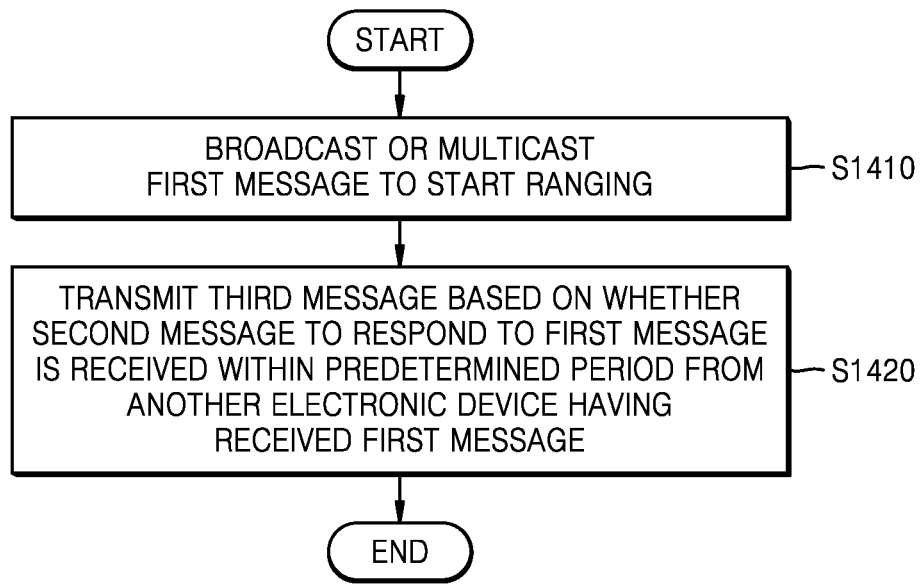
FIG. 14 is a flowchart of an operation procedure of an electronic device, according to embodiments of the disclosure.

FIG. 14 is a flowchart of an operation procedure of an electronic device, according to embodiments of the disclosure.

Referring to FIG. 14, in operation S1410, an electronic device may broadcast or multicast a first message to start ranging. For example, the electronic device may broadcast or multicast a poll packet to start a ranging operation. In various embodiments, the first message may refer to a poll packet or a ranging frame. Broadcasting or multicasting the first message may start the ranging operation (ranging poll) with another electronic device that has received the first message.

In operation S1420, the electronic device may transmit a third message, based on whether a second message to respond to the first message is received within a predetermined period of time from the other electronic device having received the first message. The second message may refer to a response packet or a response message transmitted by the other electronic device having received the first message. The third message may refer to an intermediate poll packet or an intermediate poll message transmitted by the electronic device when the electronic device fails to receive the second message for the predetermined period of time. The electronic device may transmit the third message, when the electronic device has not received, from the other electronic device having received the first message, the second message in return for the first message within the predetermined period of time. For example, when the electronic device has not received the second message in return for the first message for the certain period of time after broadcasting or multicasting the first message, the electronic device may transmit the intermediate poll. Apart from the other electronic device having received the first massage and the intermediate poll, still another electronic device that has received the intermediate poll may determine that the channel is occupied and may not broadcast or multicast the poll packet for ranging. In various embodiments of the disclosure, the intermediate poll may refer to ACK.

At least one of the first message, the second message, and the third message may include information relating to a time for which the electronic device occupies the channel used to perform the UWB based ranging. Frame structures of the aforementioned messages will now be described in connection with FIGS. 15A and 15B.

Figure 15A:
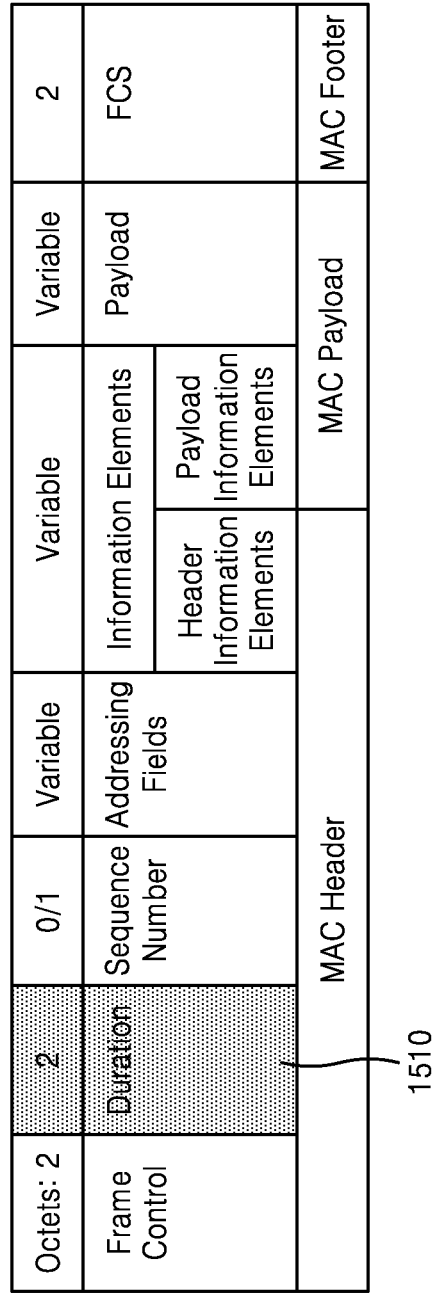
FIG. 15A illustrates a frame structure of a message, according to an embodiment of the disclosure.

FIG. 15A illustrates a frame structure of a message, according to an embodiment of the disclosure.

Referring to FIG. 15A, an MAC frame format of a packet (or message) for UWB ranging may include a duration field. For example, the message frame in FIG. 15A may include a duration field 1510. The duration field 1510 may have a length of 2 or 3 octets, but is not limited thereto. For the other fields of FIG. 15A, definitions of fields in the MAC frame format for UWB in the IEEE 802.15.8 may be used.

Figure 15B:
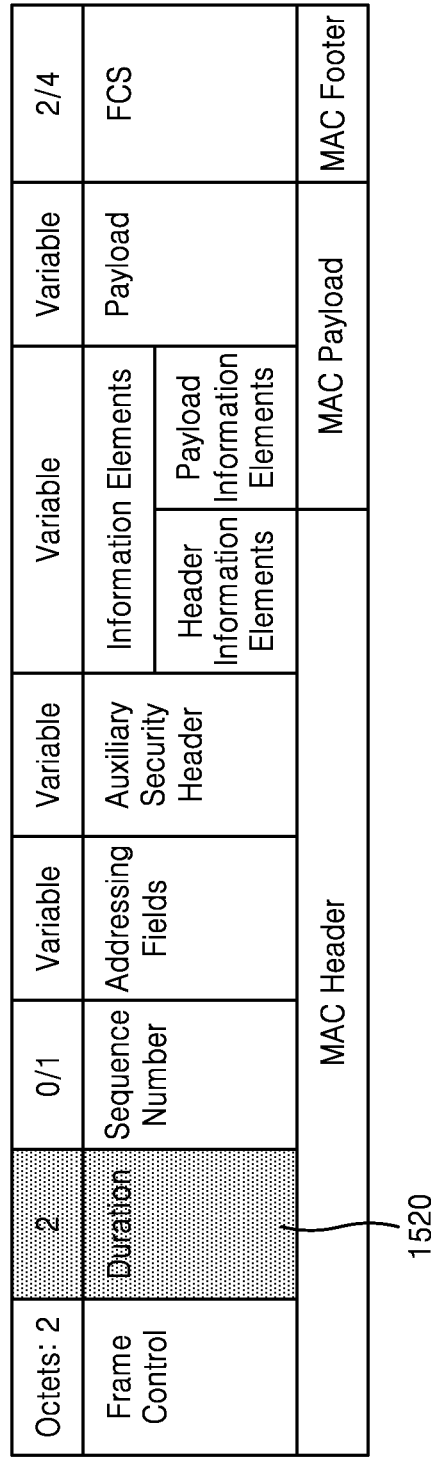
FIG. 15B illustrates a frame structure of a message, according to another embodiment of the disclosure.

FIG. 15B illustrates a frame structure of a message, according to another embodiment of the disclosure.

Referring to FIG. 15B, an MAC frame format of a packet (or message) for UWB ranging may include a duration field. For example, the message frame in FIG. 15B may include a duration field 1520. The duration field 1520 may have a length of 2 or 3 octets, but is not limited thereto. For the other fields of FIG. 15B, definitions of fields in the MAC frame format for UWB in the IEEE 802.15.4 may be used. In various embodiments of the disclosure, information relating to duration in a channel as described in connection with FIGS. 15A and 15B may be used to postpone message transmission in the channel. Specifically, electronic devices may use the information relating to the duration included in the received message to set a certain period of time for which no message is to be transmitted. The period of time for which no message is to be transmitted may refer to a NAV. Configuring NAVs in electronic devices will now be described in connection with FIGS. 16A and 16B.

Figure 16A:
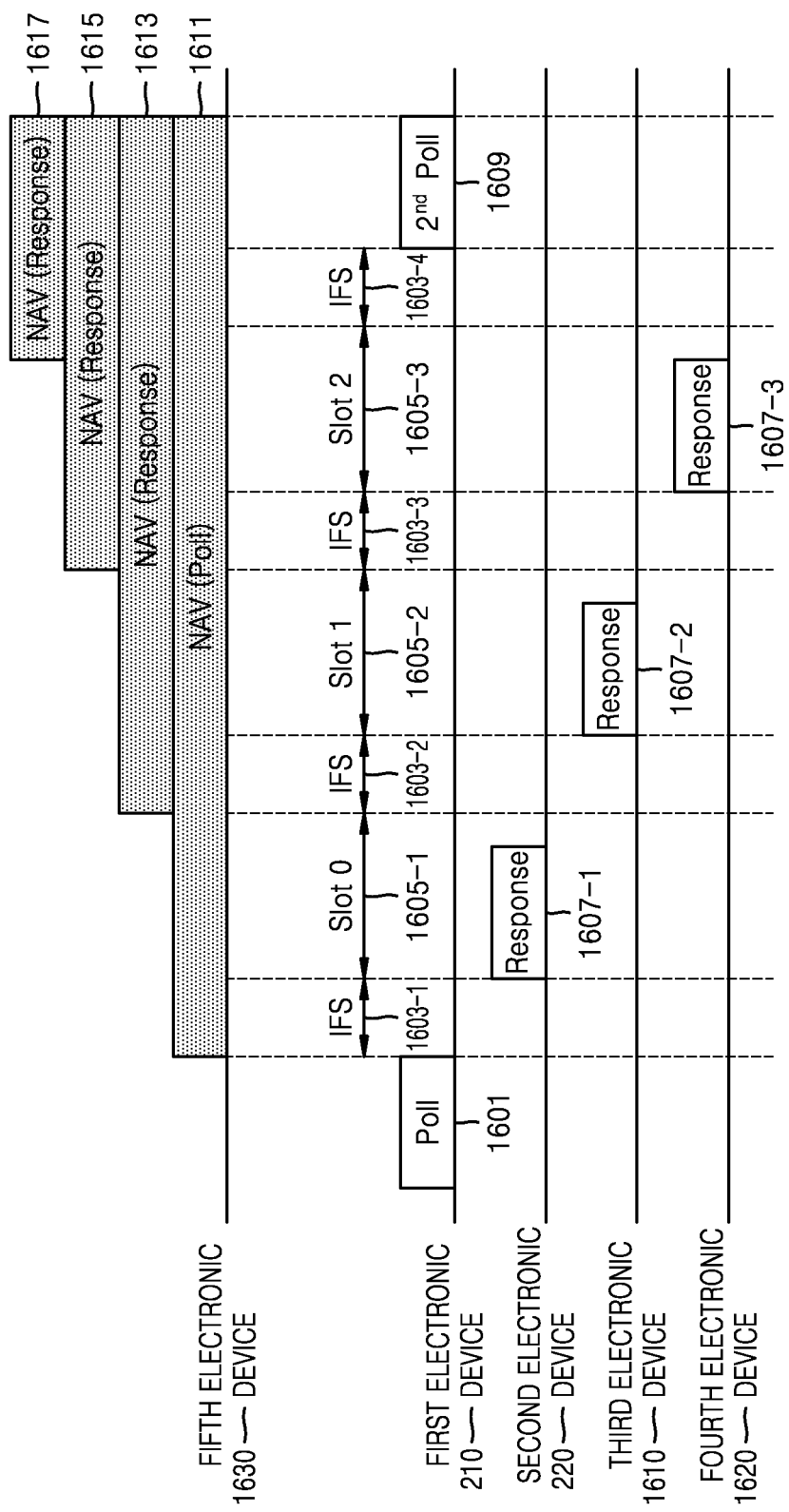
FIG. 16A is a diagram for schematically describing NAV configuration operations of electronic devices, according to an embodiment of the disclosure.

FIG. 16A is a diagram for schematically describing NAV configuration operations of electronic devices, according to an embodiment of the disclosure. FIG. 16A describes that NAVs are configured in scheduled multicast ranging.

Referring to FIG. 16A, the first electronic device 210 may transmit a poll message 1601 to the second electronic device 220, a third electronic device 1610, and a fourth electronic device 1620. At this time, a fifth electronic device 1630 may also receive the poll message 1601. In FIG. 16A, an inter-frame space (IFS) 1603-1 may be set between an end of transmission of the poll message 1601 of the first electronic device 210 and a transmission slot. Furthermore, an IFS 1603-2 may be set between transmission slot 0 1605-1 and transmission slot 1 1605-2, and an IFS 1603-3 may be set between the transmission slot 1 1605-2 and transmission slot 2 1605-3. Moreover, an IFS 1603-4 may be set between the transmission slot 2 1605-3 and a second poll message 1609. The poll message 1601 transmitted by the first electronic device 210 may include duration information. The duration information may refer to information about channel duration until the end of the scheduled multicast ranging between the first, second, third, and fourth electronic devices 210, 220, 1610, and 1620. In various embodiments, the poll message 1601 may include additional information relating to the number of transmission slots and a length of the transmission slot. Furthermore, the poll message 1601 may include the second, third, and fourth electronic devices 220, 1610 and 1620 in a device ID list, and represent the electronic devices with respective MAC addresses. The order in which the electronic devices are included in the device ID list may indicate an order in which the respective electronic devices use the transmission slots. In FIG. 16A, there may be three transmission slots allocated for the first electronic device 210. In the device ID list included in the poll message 1601 transmitted by the first electronic device 210, the second, third, and fourth electronic devices 220, 1610, and 1620 may be sequentially included. The second electronic device 220 may use the transmission slot 0 1605-1, the third electronic device 1610 the transmission slot 1 1605-2, and the fourth electronic device 1620 the transmission slot 2 1605-3. For example, the second electronic device 220 may transmit a response message 1607-1 to the poll message 1601 in the transmission slot 0 1605-1. The third electronic device 1610 may transmit a response message 1607-2 to the poll message 1601 in the transmission slot 1 1605-2. The fourth electronic device 1620 may transmit a response message 1607-3 to the poll message 1601 in the transmission slot 2 1605-3. The first electronic device 210 may transmit a second poll message 1609 in return for the received response message. In various embodiments, the fifth electronic device 1630 having received the poll message 1601 from the first electronic device 210 may use the information relating to duration included in the poll message 1601 to configure a NAV 1611 for the poll message 1601. Furthermore, the response messages 1607-1, 1607-2, and 1607-3 transmitted by the second, third, and fourth electronic devices 220, 1610, and 1620, respectively, may each include information relating to duration. The information relating to duration included in the response message may be established based on the information relating to the duration included in the poll message 1601. The information relating to duration included in the response message may refer to duration information until the end of the scheduled multicast ranging. The fifth electronic device 1630 having received the response message may configure a NAV using the information relating to duration included in the response message. For example, the fifth electronic device 1630 may configure a NAV 1613 for the response message 1607-1 using the duration information included in the response message 1607-1 transmitted by the second electronic device 220. Furthermore, the fifth electronic device 1630 may configure a NAV 1615 for the response message 1607-2 using the duration information included in the response message 1607-2 transmitted by the third electronic device 1610. Moreover, the fifth electronic device 1630 may configure a NAV 1617 for the response message 1607-3 using the duration information included in the response message 1607-3 transmitted by the fourth electronic device 1620. The transmission slots in FIG. 16A may be referred to as slots. The slots may be set to have a variable length.

Figure 16B:
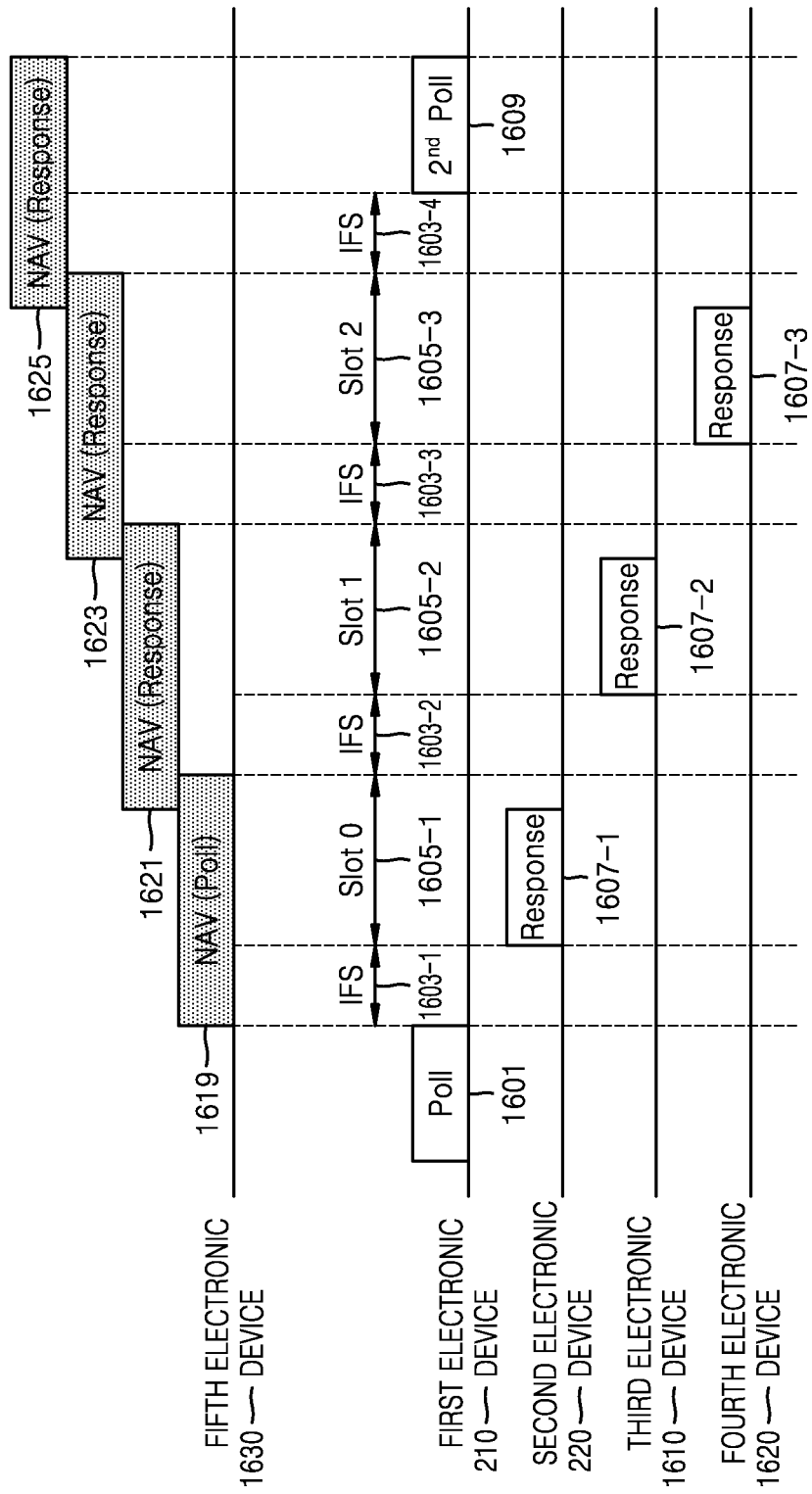
FIG. 16B is a diagram for schematically describing NAV configuration operations of electronic devices, according to another embodiment of the disclosure.

FIG. 16B is a diagram for schematically describing NAV configuration operations of electronic devices, according to another embodiment of the disclosure. FIG. 16B describes that NAVs are configured in scheduled multicast ranging.

Referring to FIG. 16B, the first electronic device 210 may transmit the poll message 1601 to the second electronic device 220, the third electronic device 1610, and the fourth electronic device 1620. At this time, the fifth electronic device 1630 may also receive the poll message 1601. In FIG. 16B, the inter-frame space (IFS) 1603-1 may be set between an end of transmission of the poll message 1601 of the first electronic device 210 and a transmission slot. Furthermore, the IFS 1603-2 may be set between the transmission slot 0 1605-1 and the transmission slot 1 1605-2, and the IFS 1603-3 may be set between the transmission slot 1 1605-2 and the transmission slot 2 1605-3. Moreover, the IFS 1603-4 may be set between the transmission slot 2 1605-3 and the second poll message 1609. The poll message 1601 transmitted by the first electronic device 210 may include duration information. The duration information may include information relating to duration until the end of a subsequent response message transmission. For example, the duration information included in the poll message 1601 may refer to information relating to channel duration from an end of the transmission of the poll message 1601 to an end of the transmission slot 0 1605-1 in which the response message 1607-1 is transmitted. The fifth electronic device 1630 having received the poll message 1601 may use the information relating to the duration to configure a NAV 1619 for the poll message 1601.

The response messages 1607-1 and 1607-2 transmitted by the second and third electronic devices 220 and 1610, respectively, may each include information relating to the duration. The information relating to the duration may include information relating to duration until the end of a subsequent response message transmission. For example, the duration information included in the response message 1607-1 may refer to information relating to channel duration from an end of the transmission of the response message 1607-1 to an end of the transmission slot 1 1605-2 in which the response message 1607-2 is transmitted. The fifth electronic device 1630 having received the response message 1607-1 may configure a NAV 1621 for the response message 1607-1. Furthermore, the duration information included in the response message 1607-2 may refer to information relating to channel duration from an end of the transmission of the response message 1607-2 to an end of the transmission slot 2 1605-3 in which the response message 1607-3 is transmitted. The fifth electronic device 1630 having received the response message 1607-2 may configure a NAV 1623 for the response message 1607-2.

The response message 1607-3 transmitted by the fourth electronic device 1620 may include information relating to the duration. The information relating to the duration may include information relating to duration until the end of transmission of the second poll message 1609. The fifth electronic device 1630 having received the response message 1607-3 may use the information relating to the duration included in the response message 1607-3 to configure a NAV 1625 for the response message 1607-3. Even when messages transmitted or received between the respective electronic devices include information relating to duration on a channel as described above, collision may occur due to other electronic device(s) activated during the ranging of the electronic device. An example in which such a collision occurs will be described in connection with FIG. 17.

Figure 17:
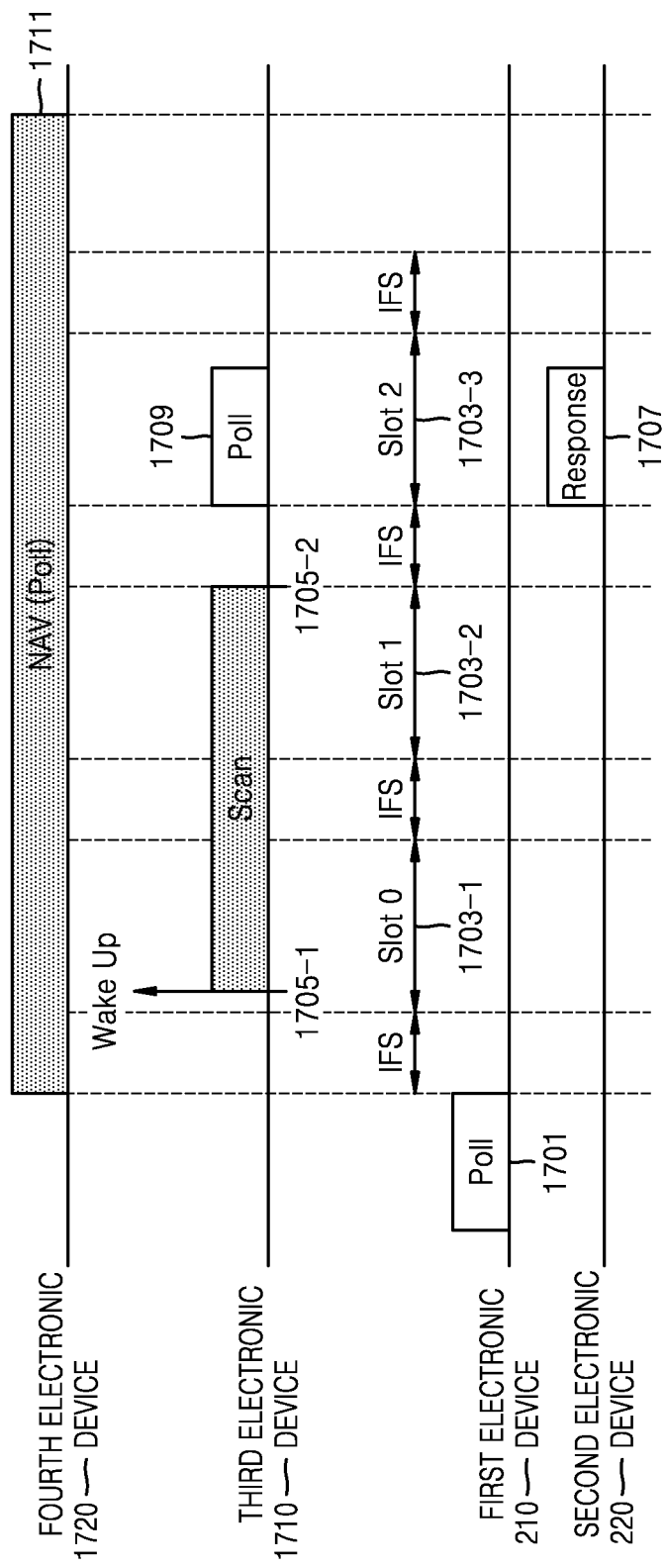
FIG. 17 is a diagram for schematically describing NAV configuration operations of electronic devices, according to embodiments of the disclosure.

FIG. 17 is a diagram for schematically describing NAV configuration operations of electronic devices, according to embodiments of the disclosure.

Referring to FIG. 17, the first electronic device 210 may transmit a poll message 1701. In this case, it may be assumed that the first electronic device 210 transmits the poll message for multicast-contention or broadcast to perform ranging. The poll message 1701 may not include the device ID list. In the multicast-contention case, a multicast group ID for a ranging target may be included in the poll message 1701. In the broadcast case, the information relating to a ranging target may not be included in the poll message 1701. The fourth electronic device 1720 having received the poll message 1701 may configure a NAV 1711 for the poll message 1701.

The second electronic device 220 may receive the poll message 1701 from the first electronic device 210, and select any of transmission slot 0 1703-1, transmission slot 1 1703-2, and transmission slot 2 1703-3 to transmit a response message. For example, the second electronic device 220 may transmit a response message 1707 in the transmission slot 2 1703-3.

The third electronic device 1710 may be activated at a first point in time 1705-1 after the first electronic device 210 transmits the poll message 1701, so the third electronic device 1710 may not receive the poll message 1701 from the first electronic device 210. Accordingly, the third electronic device 1710 may not configure a NAV for the poll message 1701. The first point in time 1705-1 is not limited to what is shown in FIG. 17, but may be any point in time after the poll message 1701 is transmitted. The activated third electronic device 1710 may scan a channel until a second point in time 1705-2. After scanning the channel for ranging, the third electronic device 1710 may transmit a poll message 1709. In this case, the response message 1707 transmitted by the second electronic device 220 and the poll message 1709 transmitted by the third electronic device 1710 may be transmitted at the same time, so the first electronic device 210 may simultaneously receive the response message 1707 and the poll message 1709. This may cause collision in the channel for ranging, and the first electronic device 210 may not succeed in decoding data. As described above, to avoid collision in the channel for ranging, operations of the first electronic device 210 may be performed as will be discussed in connection with FIG. 18.

Figure 18:
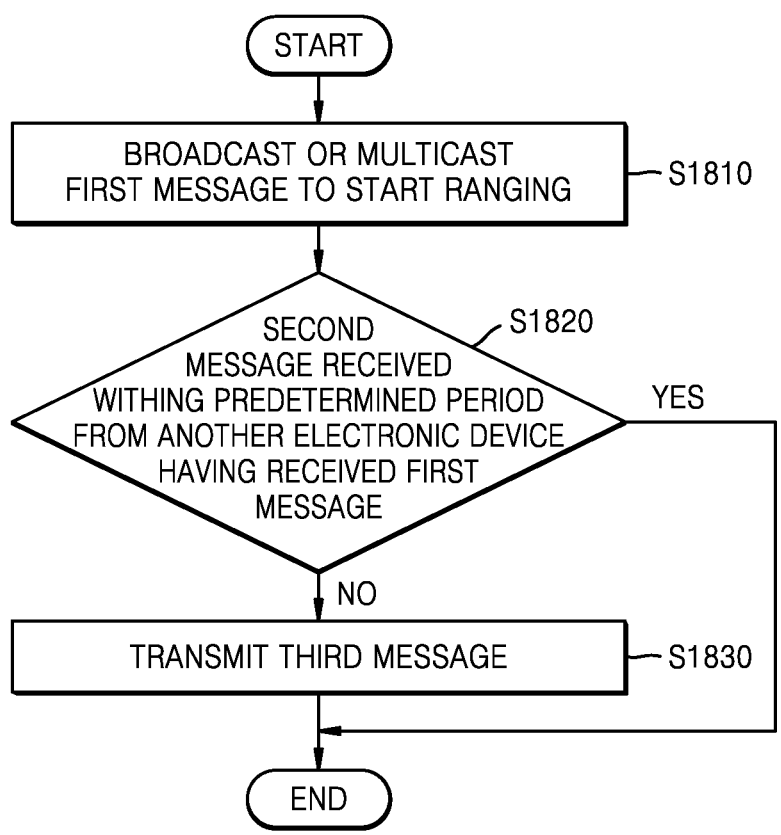
FIG. 18 is a flowchart of a message transmission and reception operation procedure of an electronic device, according to embodiments of the disclosure.

FIG. 18 is a flowchart of a message transmission and reception operation procedure of an electronic device, according to embodiments of the disclosure.

Referring to FIG. 18, in operation S1810, an electronic device may broadcast or multicast a first message to start ranging. For example, the electronic device may broadcast or multicast a poll packet to start a ranging operation. In various embodiments, the first message may refer to a poll packet or a ranging frame. Broadcasting or multicasting the first message may start the ranging operation (ranging poll) with another electronic device that has received the first message. In various embodiments, the electronic device may identify whether a channel is occupied based on a preamble signal, to broadcast or multicast the first message. The electronic device may broadcast or multicast the first message based on the determination of whether the channel is occupied based on the preamble signal. In an embodiment, when the first message is multicast, the first message may be transmitted in a mutlicast-contention based ranging method.

In operation S1820, the electronic device may determine whether a second message is received within a predetermined period of time from another electronic device having received the first message. The electronic device may terminate the operation when receiving the second message to respond to the first message within the predetermined period of time from the other electronic device having received the first message. When the electronic device has not received the second message in return for the first message within the predetermined period of time, from the other electronic device having received the first message, the electronic device may perform operation S1830. The predetermined period of time may refer to an estimated period for which the second message is to be received from the other electronic device. The predetermined period of time may be set in slots. Alternatively, the predetermined period of time may refer to a period of time required for an electronic device activated after the first message is broadcast or multicast to scan a channel. Alternatively, the predetermined period of time may be determined based on an estimated period for which the second message is to be received from the other electronic device, and a period of time required for an electronic device activated after the first message is broadcast or multicast to scan a channel.

Figure 19A:
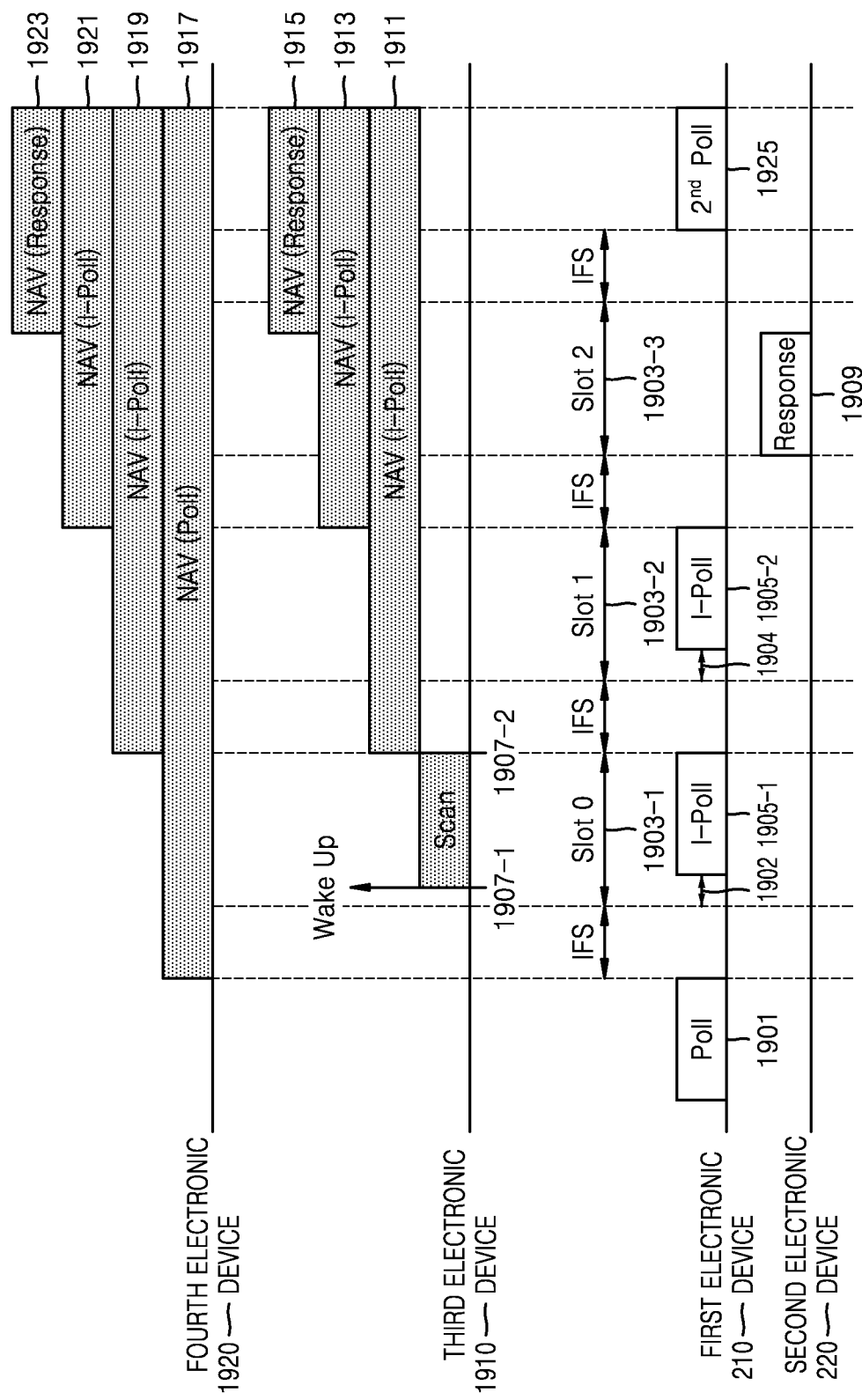
FIG. 19A is a diagram for schematically describing NAV configuration operations of electronic devices based on intermediate (I) poll (I-poll) message transmission, according to embodiments of the disclosure.
Figure 19B:
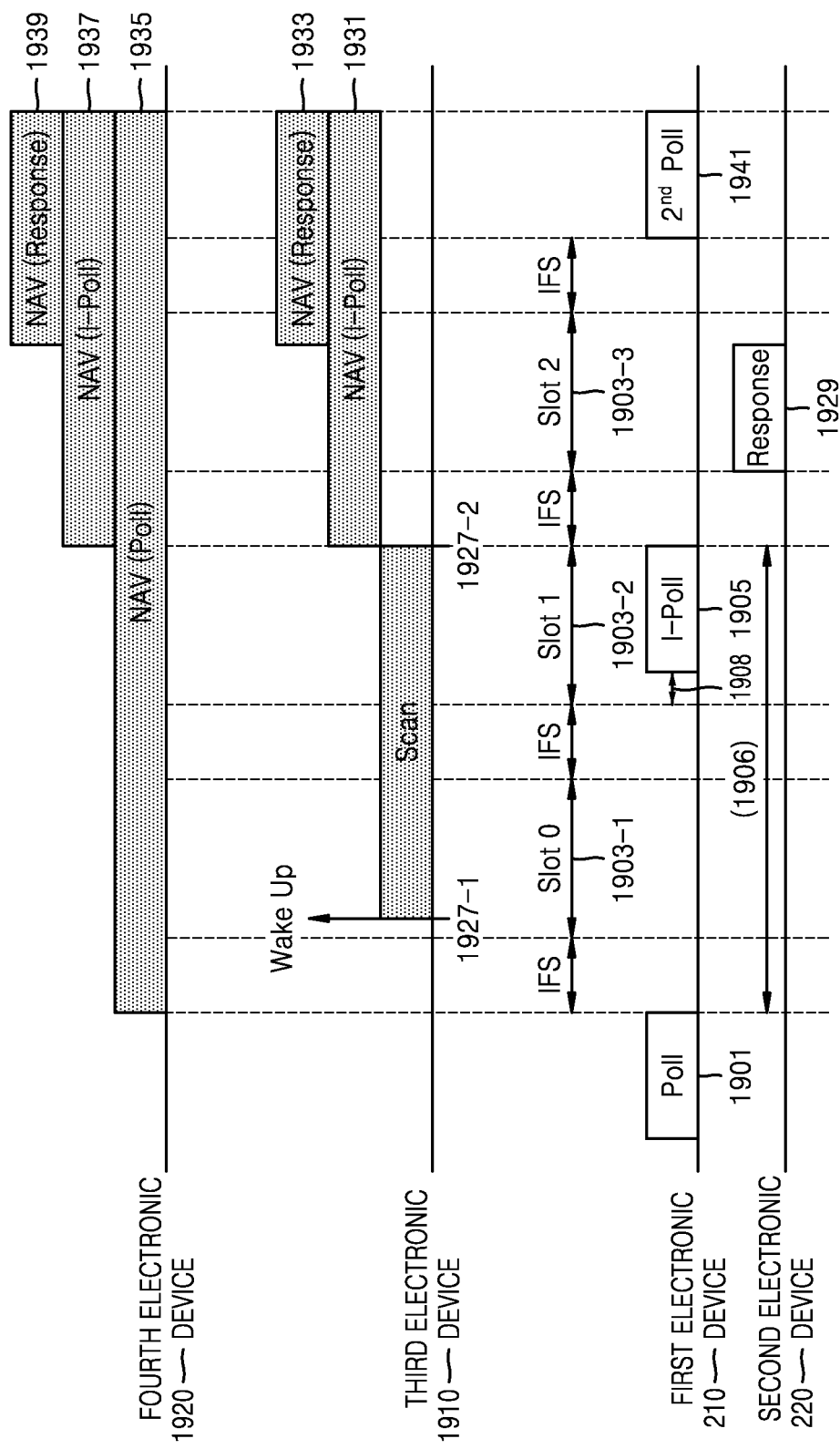
FIG. 19B is a diagram for schematically describing NAV configuration operations of electronic devices based on intermediate poll message transmission, according to embodiments of the disclosure.

In operation S1830, the electronic device may transmit a third message. The third message may be referred to as intermediate poll. In various embodiments, when an electronic device activated after the first message is broadcast or multicast receives the third message, the electronic device may determine that the channel is occupied and may not transmit a poll message. In an embodiment, the third message may be transmitted no matter whether an electronic device activated after the first message is broadcast or multicast broadcasts or multicasts a poll message for ranging. With the transmission of the third message, collision from packet transmission or reception between different electronic devices in the UWB channel may be avoided. Embodiments in which NAVs of electronic devices are configured based on transmission of the third message will now be described in connection with FIGS. 19A and 19B. In FIGS. 19A and 19B, an intermediate poll (I-poll) message may refer to the third message of FIG. 18. In FIGS. 18, 19A and 19B, the third message or the I-poll message may refer to ACK.

FIG. 19A is a diagram for schematically describing NAV configuration operations of electronic devices based on I-poll message transmission, according to embodiments of the disclosure.

Referring to FIG. 19A, the first electronic device 210 may broadcast or multicast a poll message 1901 for ranging. When the first electronic device 210 has not received a response message from the second electronic device 220 within a predetermined period of time, the first electronic device 210 may transmit the I-poll message. The predetermined period of time may refer to an estimated period for which the response message is to be received from the second electronic device 220. The first electronic device 210 may transmit the I-poll message in slots. In this case, after the start of a slot, the first electronic device 210 may wait for a maximum time for which the response message is expected to be received and may transmitting the I-poll message. For example, after transmission slot 0 1903-1 is started, the first electronic device 210 may wait for a period 1902 for which reception of a response message from the second electronic device 220 is estimated and when no response message is received from the second electronic device 220, may transmit an I-poll message 1905-1. The period 1902 for which reception of the response message is estimated may refer to a certain time interval from a starting point at which reception of the response message is estimated to start. Furthermore, after transmission slot 1 1903-2 is started, the first electronic device 210 may wait for a period 1904 for which reception of a response message from the second electronic device 220 is estimated, and when no response message is received from the second electronic device, may transmit an I-poll message 1905-2. Upon reception of the poll message 1901, the second electronic device 220 may transmit a response message 1909 in response in slot 2 1903-3. The first electronic device 210 may receive the response message 1909 and transmit a corresponding second poll message 1925.

When the third electronic device 1910 activated after the poll message 1901 is broadcast or multicast receives the I-poll message, the third electronic device 1910 may determine that the channel is occupied and may not transmit a poll message. For example, the third electronic device 1910 may be activated at a first point in time 1907-1 to scan the channel until a second point in time 1907-2. The first point in time 1907-1 is not limited to what is shown in FIG. 19A, but may be any point in time after the poll message 1901 is transmitted. The third electronic device 1910 may receive the I-poll message 1905-1 from the first electronic device 210 and configure a NAV 1911 for the I-poll message 1905-1. The third electronic device 1910 may receive the I-poll message 1905-2 from the first electronic device 210 and configure a NAV 1913 for the I-poll message 1905-2. The third electronic device 1910 may also configure a NAV 1915 for the response message 1909 received from the second electronic device 220. Specifically, the third electronic device 1910 activated after the poll message 1901 is broadcast or multicast may not transmit a message for ranging for a period as long as the configured NAV value. This may prevent occurrence of collision due to ranging message transmission of the third electronic device 1910 in the channel for ranging of the first and second electronic devices 210 and 220.

The fourth electronic device 1920 may receive the poll message 1901 from the first electronic device 210 and configure a NAV 1917 for the poll message 1901. The fourth electronic device 1920 may receive the I-poll message 1905-1 from the first electronic device 210 and configure a NAV 1919 for the I-poll message 1905-1. The fourth electronic device 1920 may receive the I-poll message 1905-2 from the first electronic device 210 and configure a NAV 1921 for the I-poll message 1905-2. Furthermore, the fourth electronic device 1920 may receive the response message 1909 from the second electronic device 220 and configure a NAV 1923 for the response message 1909. The NAVs may be configured based on the respective duration information included in the poll message, the I-poll message, or the response message.

FIG. 19B is a diagram for schematically describing NAV configuration operations of electronic devices based on intermediate poll message transmission, according to embodiments of the disclosure.

Referring to FIG. 19B, the first electronic device 210 may broadcast or multicast the poll message 1901 for ranging. When the first electronic device 210 has not received a response message from the second electronic device 220 within a predetermined period of time, the first electronic device 210 may transmit the I-poll message. The predetermined period of time may refer to a period of time required for an electronic device activated after the poll message is broadcast or multicast to scan a channel. For example, the first electronic device may transmit an I-poll message 1905 within a period 1906 estimated to be required for an electronic device activated right after the poll message 1901 is broadcast or multicast to scan a channel, by considering a probability of the activated electronic device being present. Specifically, before the end of the period 1906 estimated to be required for the activated electronic device to scan a channel, the first electronic device 210 may wait for a period for which it is able to transmit the I-poll message 1905 without being affected by transmission of a response message of the second electronic device 220 in the subsequent slot, and transmit the I-poll message 1905. The period for which the I-poll message 1905 may be transmitted without being affected by transmission of a response message of the second electronic device 220 in the subsequent slot may be a period 1908 for which the response message is estimated to be received from the second electronic device 220 after the start of slot 1 1903-2. After the I-poll message 1905 is transmitted, the second electronic device 220 may transmit a response message 1929 for the poll message 1901. The first electronic device 210 may receive the response message 1929 and transmit a second poll message 1941. The third electronic device 1910 may receive the I-poll message 1905 from the first electronic device 210 and configure a NAV 1931 for the I-poll message 1905. The third electronic device 1910 may also configure a NAV 1933 for the response message 1929 received from the second electronic device 220. Specifically, the third electronic device 1910 activated after the poll message 1901 is broadcast or multicast may not transmit a message for ranging for a period as long as the configured NAV value. This may prevent occurrence of collision due to ranging message transmission of the third electronic device 1910 in the channel for ranging of the first and second electronic devices 210 and 220.

The fourth electronic device 1920 may receive the poll message 1901 from the first electronic device 210 and configure a NAV 1935 for the poll message 1901. The fourth electronic device 1920 may also receive the I-poll message 1905 from the first electronic device 210 and configure a NAV 1937 for the I-poll message 1905. Furthermore, the fourth electronic device 1920 may receive the response message 1929 from the second electronic device 220 and configure a NAV 1939 for the response message 1929. The NAVs may be configured based on the respective duration information included in the poll message, the I-poll message, or the response message.

In various embodiments of the disclosure, an electronic device transmits an I-poll message based on whether receiving a response message within a predetermined period from another electronic device having received the message to start ranging, so that a packet collision in the channel with an electronic device activated after the message to start ranging is broadcast or multicast may be avoided.

In various embodiments of the disclosure, the I-poll message may be transmitted as an ACK message. ACK message and data message frame structures will now be described in connection with FIG. 20.

Figure 20:
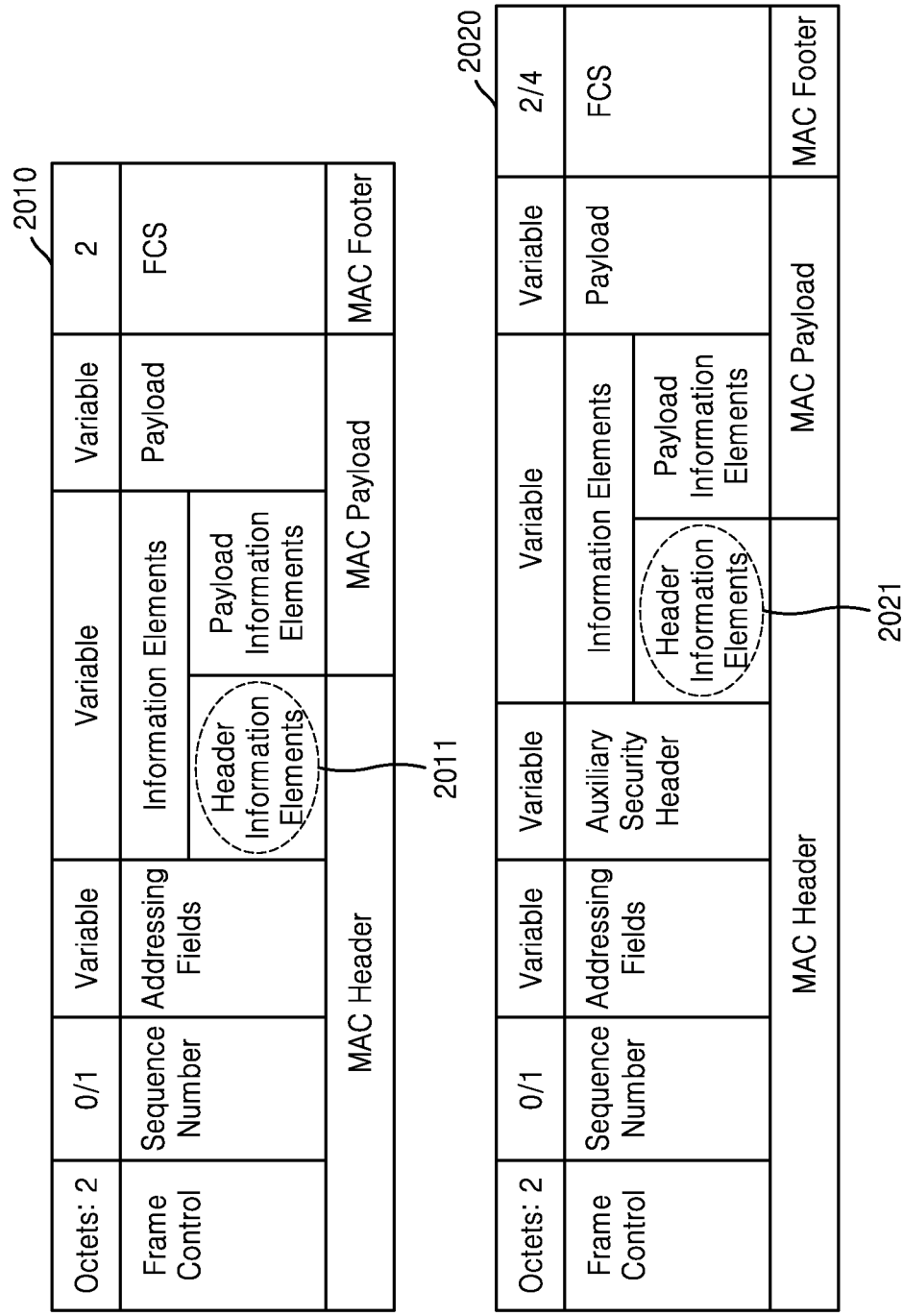
FIG. 20 illustrates ACK message and data message frame structures, according to embodiments of the disclosure.

FIG. 20 illustrates ACK message and data message frame structures, according to embodiments of the disclosure.

Referring to FIG. 20, a structure of an ACK message frame 2010 and a structure of a data message frame 2020 may be defined in an enhanced ACK frame format and a data frame format, respectively, of IEEE 802.15.4. A header IE 2011 included in the ACK message frame 2010 may include information relating to duration. A header IE 2021 included in the data message frame 2020 may include information relating to duration. In various embodiments, the information relating to duration may include information relating to a time for which an electronic device occupies the channel. In an embodiment, the header IE 2011 of the ACK message and the header IE 2021 of the data message may not include the information relating to duration. In this case, an electronic device having received the ACK message or data message may not configure a NAV. In FIG. 20, a frame check sequence (FCS) field included in the message frame may have a different length depending on the frame type. For example, for the ACK message frame 2010, a length of the FCS field may be 2 octets. For the data message frame 2020, a length of the FCS field may be 2 or 4 octets. The other fields in FIG. 20 may be defined by definitions of fields in the MAC frame format for UWB in the IEEE 802.15.4. A duration IE that may be included in the aforementioned header IE will now be described in connection with FIG. 21.

Figure 21:
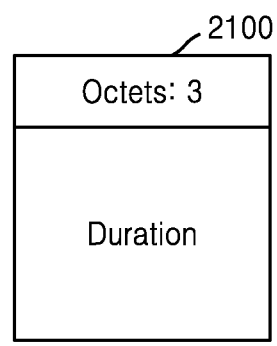
FIG. 21 illustrates a duration information element (IE), according to embodiments of the disclosure.

FIG. 21 illustrates a duration IE, according to embodiments of the disclosure.

Referring to FIG. 21, a duration IE 21000 may provide information about a time used to exchange packets for ranging between electronic devices. For example, the duration IE 2100 may have a duration content field for indicating channel duration of an electronic device. A length of the duration content field may be 2 or 3 octets. Although it is shown to have 3 octets, it is not limited thereto. In various embodiments, the duration IE 2100 may be included in the header IE as described in connection with FIG. 20. For example, the header IE 2011 of the ACK message frame 2010 may include the duration IE 2100, and the header IE 2021 of the data message frame 2020 may also include the duration IE 2100. In various embodiments of the disclosure, information relating to duration as described in connection with FIG. 21 may be used to postpone message transmission in the channel. Specifically, electronic devices may use the information relating to the duration included in the received message to set a certain period of time for which no message is to be transmitted. The period of time for which no message is to be transmitted may refer to a NAV. However, in an embodiment of the disclosure, when the information relating to duration is not included in the message received by the electronic devices, the electronic device having received the message may not configure a NAV but may perform channel scanning at arbitrarily determined time intervals to avoid channel collision due to message transmission. This channel collision avoidance method will now be described in connection with FIG. 22.

Figure 22:
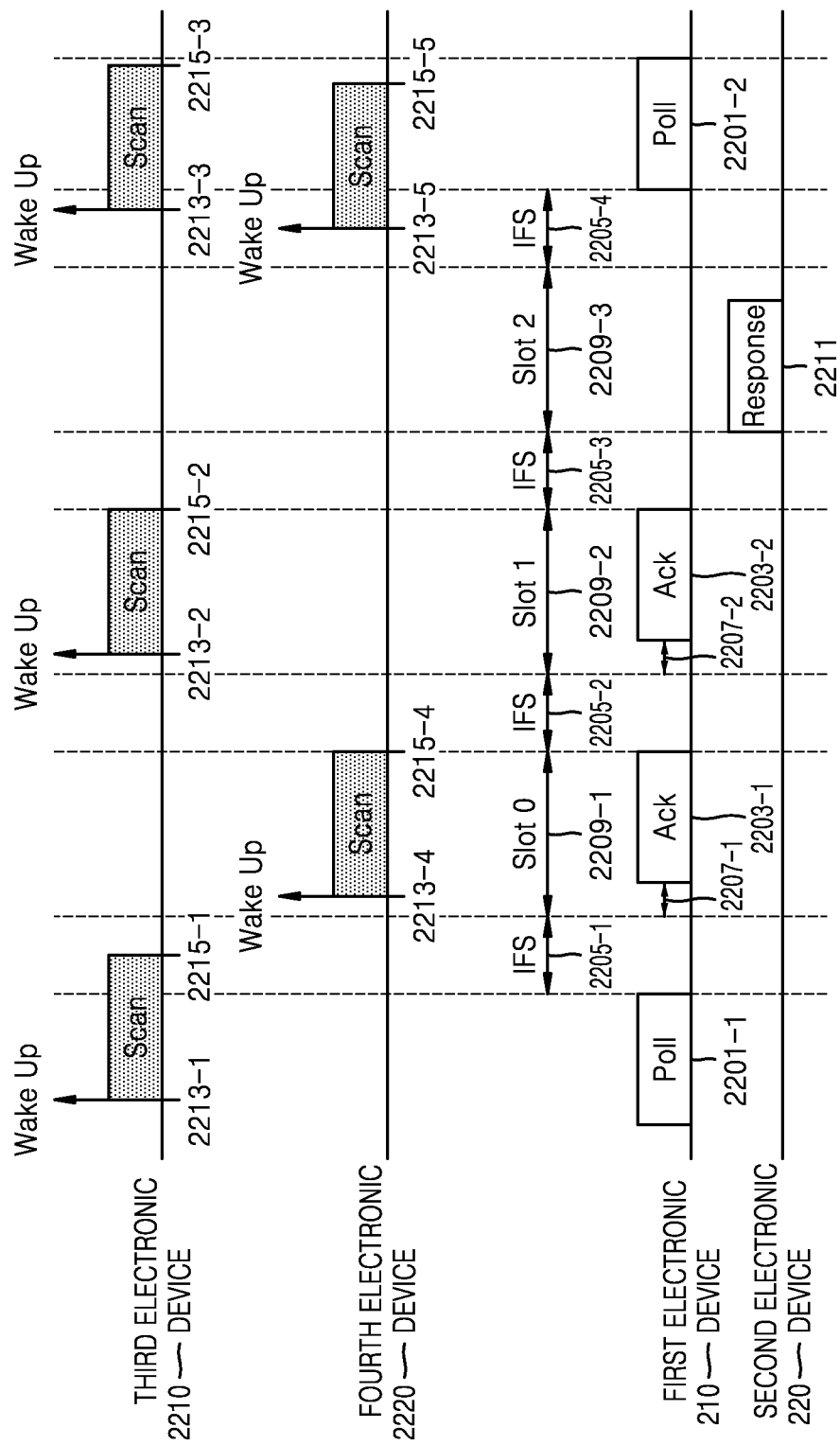
FIG. 22 is a diagram for schematically describing collision avoidance operations in a channel based on ACK message transmission, according to embodiments of the disclosure.

FIG. 22 is a diagram for schematically describing collision avoidance operations in a channel based on ACK message transmission, according to embodiments of the disclosure.

Referring to FIG. 22, the first electronic device 210 may transmit a poll message 2201-1 for ranging to the second electronic device 220. In various embodiments, the first electronic device 210 may be referred to as an initiator and the second electronic device 220 may be referred to as a responder. In FIG. 22, an inter-frame space (IFS) may be set between an end of transmission of the poll message of the first electronic device 210 and a transmission slot. For example, an IFS 2205-1 may be set between an end of transmission of the poll message 2201-1 of the first electronic device 210 and transmission slot 0 2209-1. An IFS 2205-2 may be set between the transmission slot 0 2209-1 and transmission slot 1 2209-2. An IFS 2205-3 may be set between the transmission slot 1 2209-2 and transmission slot 2 2209-3. An IFS 2205-4 may also be set between the transmission slot 2 2209-3 and a start of transmission of a poll message 2201-2. In various embodiments, the poll message 2201-1 or the poll message 2201-2 transmitted by the first electronic device 210 may not include the aforementioned information relating to duration. In various embodiments, the poll message 2201-1 or the poll message 2201-2 transmitted by the first electronic device 210 may include additional information about the number of transmission slots and a length of transmission slot. Furthermore, the poll message 2201-1 or the poll message 2201-2 may not include information about targets for ranging. In various embodiments, the second electronic device 220 having received the poll message 2201-1 is able to transmit a response message in the transmission slot 0 2209-1, transmission slot 1 2209-2, and transmission slot 2 2209-3. For example, the second electronic device 220 may arbitrarily select the transmission slot 2 2209-3 from among the transmission slot 0 2209-1, transmission slot 1 2209-2, and transmission slot 2 2209-3, and transmit a response message 2211 in the transmission slot 2 2209-3. In this case, the transmission slot 0 2209-1, transmission slot 1 2209-2, or transmission slot 2 2209-3 may be allocated by the first electronic device 210. In various embodiments, the transmission slots may be referred to as slots. The slots may be set to have a variable length.

In various embodiments, when the first electronic device 210 has not received a response message from the second electronic device 220 for a predetermined period of time, the first electronic device 210 may transmit an ACK message. The predetermined period of time may refer to an estimated period for which the response message is to be received from the second electronic device 220. Specifically, after the start of a slot, the first electronic device 210 may wait for a maximum time for which the response message is expected to be received before transmitting the ACK message. For example, after transmission slot 0 2209-1 is started, the first electronic device 210 may wait for a period 2207-1 for which a response message is estimated to be received from the second electronic device 220 and when no response message is received from the second electronic device 220, may transmit an ACK message 2203-1. The period 2207-1 for which the response message is estimated to be received may refer to a certain time interval from a starting point at which reception of the response message is estimated to start. Furthermore, after the transmission slot 1 2209-2 is started, the first electronic device 210 may wait for a period 2207-2 for which a response message is estimated to be received from the second electronic device 220 and when no response message is received from the second electronic device 220, may transmit an ACK message 2203-2. Upon reception of the poll message 2201-1, the second electronic device 220 may transmit the response message 2211 in response in slot 2 2209-3. The first electronic device 210 may receive the response message 2211 and transmit a corresponding poll message 2201-2. In various embodiments, the poll message 2201-2 may refer to the aforementioned second poll message. In various embodiments, the ACK message may have the frame structure as described above in connection with FIG. 20. In this case, the aforementioned I-poll message may be replaced by the ACK message.

In various embodiments, a third electronic device 2210 or the fourth electronic device 2220 may perform a channel scanning operation to determine whether the channel is occupied by the first electronic device 210 or the second electronic device 220. In this case, time intervals at which the third or fourth electronic device 2210 or 2220 performs the scanning may be arbitrarily set by the each electronic device. In this case, time intervals at which the third or fourth electronic device 2210 or 2220 performs the scanning may be arbitrarily set by each electronic device. In various embodiments, when a preamble transmitted by another electronic device (e.g., the first or second electronic device 210 or 220) is detected through the scanning, the third or fourth electronic device 2210 or 2220 may not perform message transmission but may perform scanning again after a predetermined period. The predetermined period may refer to a period arbitrarily set by the third or fourth electronic device 2210 or 2220 to perform scanning. In various embodiments, the preamble may be included in a message transmitted by the first or second electronic device 210 or 220.

For example, in FIG. 22, the third electronic device 2210 may be activated at a first activation (or wake-up) point in time 2213-1 at which the poll message 2201-1 of the first electronic device 210 is being transmitted. The activated third electronic device 2210 may perform scanning to determine whether the channel for UWB is occupied. The third electronic device 2210 may perform scanning from the first activation point in time 2213-1 to a first scan ending point 2215-1. When the third electronic device 2210 determines that the channel is occupied by detecting a preamble associated with the poll message 2201-1, the third electronic device 2210 may not perform message transmission. Subsequently, the third electronic device 2210 may wait a time interval before performing scanning and then may perform scanning again. In various embodiments, the preamble associated with the poll message 2201-1 may refer to the preamble included in the poll message 2201-1. In various embodiments, the time interval at which to perform scanning may refer to a predetermined period for scanning. For example, the time interval at which to perform scanning may refer to a period between the first activation point in time 2213-1 and a second activation point in time 2213-2 or a period between the first scan ending point 2215-1 and a second activation point in time 2213-2. The third electronic device 2210 may be activated again in the second activation point in time 2213-2 to perform scanning until a second scan ending point 2251-2. In this case, the third electronic device 2210 may perform scanning in slot 1 2209-2. In the slot 1 2209-2, the third electronic device 2210 may detect a preamble associated with an ACK message transmitted by the first electronic device 210. In the case of detecting the preamble associated with the ACK message 2203-2, the third electronic device 2210 may determine that the channel is occupied by the first electronic device 210 and may not perform message transmission. In various embodiments, the preamble associated with the ACK message 2203-2 may refer to the preamble included in the ACK message 2203-2.

Subsequently, the third electronic device 2210 may wait for a time interval at which to perform scanning and perform scanning again. For example, the time interval at which to perform scanning may refer to a period between the second activation point in time 2213-2 and a third activation point in time 2213-3 or a period between a second scan ending point 2215-2 and the third activation point in time 2213-3. The third electronic device 2210 may be activated again in the third activation point in time 2213-3 to perform scanning until a third scan ending point 2215-3. In an embodiment, the first electronic device 210 may transmit the poll message 2201-2 while the third electronic device 2210 performs scanning. In this case, the third electronic device 2210 may detect a preamble associated with the poll message 2201-2. In the case of detecting the preamble associated with the poll message 2201-2, the third electronic device 2210 may determine that the channel is occupied by the first electronic device 210 and may not perform message transmission. Subsequently, the third electronic device 2210 may wait for a time interval at which to perform scanning. In various embodiments, the preamble associated with the poll message 2201-2 may refer to the preamble included in the poll message 2201-2.

In various embodiments, the fourth electronic device 2220 may be activated at a fourth activation point 2213-4 in the slot 0 2209-1. The activated fourth electronic device 2220 may scan a channel until a fourth scan ending point 2215-4. In various embodiments, the first electronic device 210 may determine that no response message is received from the second electronic device 220 in the slot 0 2209-1, and transmit the ACK message 2203-1. The fourth electronic device 2220 may detect the preamble associated with the ACK message 2203-1 in the slot 0 2209-1. In the case of detecting the preamble associated with the ACK message 2203-1, the fourth electronic device 2220 may determine that the channel is occupied by the first electronic device 210 and may not perform message transmission. In various embodiments, the preamble associated with the ACK message 2203-1 may refer to the preamble included in the ACK message 2203-1. Subsequently, the fourth electronic device 2220 may wait for a time interval at which to perform scanning and perform scanning again. For example, the time interval at which to perform scanning may refer to a period between the fourth activation point in time 2213-4 and a fifth activation point in time 2213-5 or a period between the fourth scan ending point 2215-4 and the fifth activation point in time 2213-5. The fourth electronic device 2220 may be activated again at the fifth activation point in time to perform scanning until a fifth scan ending point 2215-5. In an embodiment, the first electronic device 210 may transmit the poll message 2201-2 while the fourth electronic device 2220 performs scanning. The fourth electronic device 2210 may detect a preamble associated with the poll message 2201-2. In the case of detecting the preamble associated with the poll message 2201-2, the fourth electronic device 2220 may determine that the channel is occupied by the first electronic device 210 and may not perform message transmission. In various embodiments, the preamble associated with the poll message 2201-2 may refer to the preamble included in the poll message 2201-2. Subsequently, the fourth electronic device 2220 may wait for a time interval at which to perform scanning. Although not shown in FIG. 22, the third or fourth electronic device 2210 or 2220 may not perform message transmission when detecting the response message 2211 or the preamble associated with the response message 2211 transmitted by the second electronic device 220 during the channel scanning. In this case, the third or fourth electronic device 2210 or 2220 may wait for a time interval at which to perform scanning and perform scanning again. An operating method of the third or fourth electronic device 2210 or 220 will now be described in connection with FIG. 23.

Figure 23:
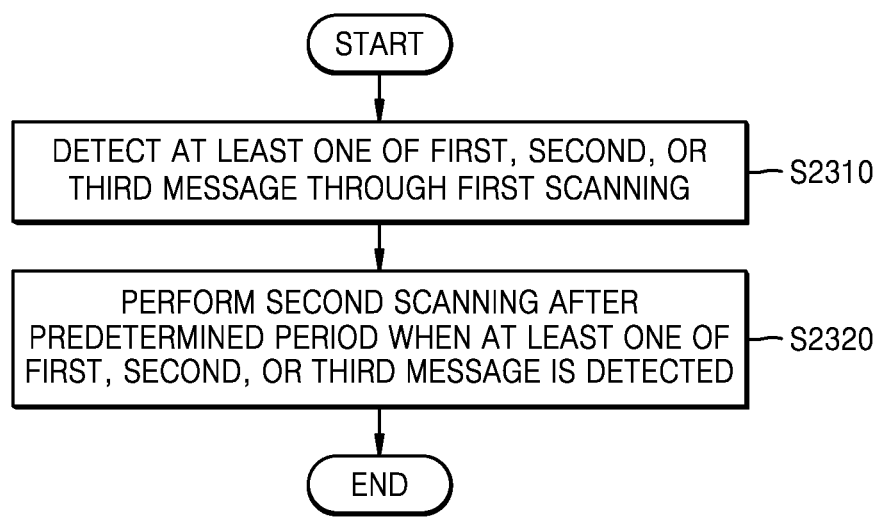
FIG. 23 is a flowchart of an operation procedure of a third or fourth electronic device, according to embodiments of the disclosure.

FIG. 23 is a flowchart of an operation procedure of the third or fourth electronic device 2210 or 2220, according to embodiments of the disclosure.

Referring to FIG. 23, in operation S2310, the third or fourth electronic device 2210 or 2220 may detect at least one of first, second, or third message through first scanning. In various embodiments, the first scanning may refer to an operation of channel scanning performed by the third or fourth electronic device 2210 or 2220 to determine whether the channel is occupied by the other electronic device. In an embodiment, the other electronic device may refer to the first or second electronic device 210 or 220. In various embodiments, the first message may include a poll message or an associated preamble transmitted by the first electronic device 210. The second message may include a response message or an associated preamble transmitted by the second electronic device 220. The third message may include an ACK message or an associated preamble transmitted by the first electronic device 210.

In operation S2320, when the at least one of the first, second, or third message is detected, the third or fourth electronic device 2210 or 2220 may perform second scanning after a predetermined period. For example, when the at least one of the first, second, or third message is detected, the third or fourth electronic device 2210 or 2220 may not perform message transmission. Subsequently, the third or fourth electronic device 2210 or 2220 may wait for a time interval at which to perform scanning and perform scanning again. In various embodiments, the predetermined period may refer to a period arbitrarily set by the third or fourth electronic device 2210 or 2220 to perform a scanning operation. In this way, the third or fourth electronic device 2210 or 2220 may avoid channel collision due to message transmission from the other electronic device without NAV configuration. In various embodiments, the other electronic device may refer to the first or second electronic device 210 or 220.

In various embodiments of the disclosure, when an electronic device has not received a response message within a predetermined period from another electronic device that had received a message to start ranging, the electronic device may transmit an ACK message. This may prevent packet collision in a channel with an electronic device activated after the message to start ranging is transmitted. Furthermore, in various embodiments of the disclosure, the activated electronic device may detect the message to start ranging, the response message or the ACK message through scanning. The activated electronic device having detected the message may not perform message transmission, and may perform scanning again after a predetermined period. At this time, a NAV may not be configured.

Figure 24:
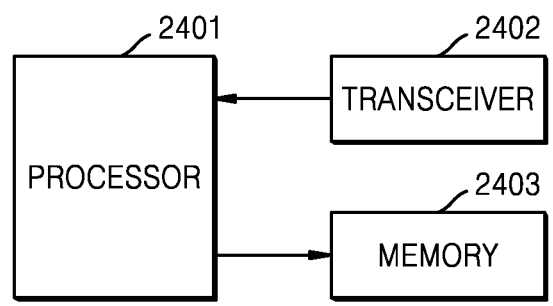
FIG. 24 is block diagram of an electronic device, according to embodiments of the disclosure.

FIG. 24 is block diagram of an electronic device, according to embodiments of the disclosure.

In embodiments of the disclosure, an electronic device may include a processor 2401, a transceiver 2402, and a memory 2403. The processor 2401 may be a single processor or multiple processors, the transceiver 2402 may be a single transceiver or multiple transceivers, and the memory 2403 may be a single memory or multiple memories.

Herein, the processor may be defined to be a circuit, an application specific integrated circuit (ASIC), or at least one processor.

In an embodiment of the disclosure, the processor 2401 may control general operation of the electronic device. For example, the processor 2401 may control signal flows among the respective blocks to perform operation according to the aforementioned flowcharts. The processor 2401 may record data to the memory 2403 or read out data from the memory 1020. The processor 2401 may further perform functions of a protocol stack requested by a communication standard. For this, the processor 2401 may include at least one processor or microprocessor, or may be part of a processor. Furthermore, part of the transceiver 2402 and the processor 2401 may be referred to as a communication processor (CP).

The processor 2401 according to an embodiment of the disclosure may control operations of the electronic device as described above in connection with FIGS. 1 to 19B.

In an embodiment of the disclosure, the transceiver 2402 may perform functions to transmit or receive a signal on a wireless channel. For example, the transceiver 2402 may perform a conversion function between a baseband signal and a bitstream according to a physical layer standard of the system. For example, for data transmission, the transceiver 2402 may generate complex symbols by encoding and modulating a bitstream for transmission. For data reception, the transceiver 2402 may reconstruct a received bitstream by demodulating and decoding the baseband signal. Furthermore, the transceiver 2402 may perform up-conversion on the baseband signal to a radio frequency (RF) band signal and transmit the resultant signal through an antenna, and may perform down-conversion on an RF band signal received through the antenna to a baseband signal. For example, the transceiver 2402 may include a transmit filter, a receive filter, an amplifier, a mixer, an oscillator, a digital-to-analog converter (DAC), an analog-to-digital converter (ADC), etc. The transceiver 2402 may also include a number of transmission and reception paths. Furthermore, the transceiver 2402 may include at least one antenna array comprised of multiple antenna elements. From the perspective of hardware, the transceiver 2402 may be comprised of a digital circuit and an analog circuit (e.g., a radio frequency integrated circuit (RFIC)). In this case, the digital circuit and the analog circuit may be implemented in a single package. The transceiver 2402 may also include multiple RF chains. The transceiver 2402 may include a first transceiver (not shown) and a second transceiver (not shown). The first transceiver may support first communication and the second transceiver may support second transmission.

Although the single transceiver 2402 is shown in FIG. 24, the first transceiver for supporting first communication and the second transceiver for supporting second communication may be separate transceivers.

In an embodiment of the disclosure, the memory 2403 may store a basic program for operation of the electronic device, an application program, data like settings information. The memory 2403 may include a volatile memory, a non-volatile memory, or a combination of the volatile memory and the non-volatile memory. The memory 2403 may also provide the stored data at the request of the processor 2401. The memory 2403 may store at least one of information received or for transmission by the transceiver 2402 and information generated by the processor 2401.

In an embodiment of the disclosure, the processor 2401 may execute the program stored in the memory 2403 to broadcast or multicast a first message to start ranging, and based on whether receiving a second message to respond to the first message within a predetermined period from another electronic device having received the first message, transmit a third message.

In an embodiment of the disclosure, at least one of the first message, the second message, and the third message may include information relating to a period for which the electronic device occupies a channel used to perform UWB based ranging.

In an embodiment of the disclosure, the information relating to the channel occupancy period may be used to postpone message transmission on the channel.

In an embodiment of the disclosure, the processor 2401 may transmit the third message, when the second message to respond to the first message has not been received within the predetermined period from the other electronic device that had received the first message.

In an embodiment of the disclosure, the predetermined period may refer to an estimated period for which the second message is to be received from the other electronic device, and the estimated period may be set in slots.

In an embodiment of the disclosure, the predetermined period may refer to a period required for an electronic device to scan a channel, the electronic device being activated after the first message is broadcast or multicast.

In an embodiment of the disclosure, the predetermined period may be determined based on an estimated period for which the second message is to be received from the other electronic device, and a period required for an electronic device to scan a channel, the electronic device being activated after the first message is broadcast or multicast, and the estimated period for which the second message is to be received may be set in slots.

In an embodiment of the disclosure, the processor 2401 may identify based on a preamble signal whether a channel is occupied, and based on whether the channel is occupied, may broadcast or multicast the first message.

In an embodiment of the disclosure, when the first message is multicast, the first message may be transmitted in a mutlicast-contention based ranging method.

In an embodiment of the disclosure, the processor 2401 may transmit the third message including ACK, when the second message in response to the first message has not been received within the predetermined period from the other electronic device that had received the first message.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

Several embodiments have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

The block diagrams as described herein may be construed by the skilled in the art as conceptual representation of circuitry for implementing the principles of the disclosure. It is also understood by the skilled in the art that any flow charts, flow diagrams, state transitions, pseudo codes, etc., may be substantially embodied in a computer-readable medium as various processes that may be carried out by a computer or processor, whether explicitly shown or not. Accordingly, the aforementioned embodiments of the disclosure may be written into a program that may be executed by a computer, and may be implemented in a universal digital computer for carrying out the program using a computer-readable recording medium. The computer-readable recording medium includes a storage medium, such as magnetic storage medium (e.g., ROM, floppy disk, hard disk, etc.), an optical medium (e.g., CD-ROM, DVD, etc.), etc.

Functions of the various elements shown in the drawings may be associated with appropriate software and thus provided by the use of dedicated hardware as well as hardware capable of executing the software. When provided by a processor, the functions may be provided by a single dedicated processor, a single shared processor, or a plurality of individual processors, some of which may be shared. Also, the explicit use of the term "processor" or "controller" should not be interpreted as making exclusive reference to hardware capable of executing software, but may be construed as implicitly including, without limitation, a digital signal processor (DSP), a ROM for storing software, a RAM, and a non-volatile storage device.

In the attached claims, an element represented as a means for performing a particular function encompasses any method of performing the particular function, the element being intended to encompass a combination of circuit elements that perform the particular function, or any form of software including firmware, microcode, etc., in combination with circuitry suitable for carrying out the software to perform the particular function.

Throughout the specification, reference to "an embodiment" of principles of the disclosure and various modifications thereof intends that particular properties, structures, features, etc., are included in at least one embodiment of the principle of the disclosure. Thus, the term "an embodiment" and any other modifications thereof do not necessarily refer to the same embodiment.

Throughout the disclosure, the expression "at least one of a or b" indicates only a, only b, bot a and b. Additionally, throughout the disclosure, the expression "at least one of a, b or c" indicates only a, only b, only c, both a and b, both a and c, both b and c, all of a, b, and c, or variations thereof. Even if more items are enumerated, they may be clearly and expansively interpreted by those skilled in the art.

The disclosure has been described with reference to the embodiments thereof.

It is to be understood that all embodiments and conditional exemplification as disclosed herein are intended to assist the skilled in the art in understanding the principles and concepts of the disclosure, and thus the skilled in the art may understand that the embodiments of the disclosure may be modified without departing from the substantial characteristics of the disclosure. Therefore, the disclosed embodiments should be considered in an illustrative sense rather than a restrictive sense. The scope of the disclosure is defined only by the following claims, and all the equivalents of the embodiments may also be construed to be in the scope of the disclosure.

The invention claimed is:

1. A method of operating an electronic device to perform ranging using ultra wideband (UWB) in a wireless communication system, the method comprising:
   broadcasting or multicasting a first message to start the ranging; and
   transmitting a third message, based on whether a second message to respond to the first message is received within a predetermined period from at least one electronic device of electronic devices having received the first message,
   wherein the predetermined period comprises an estimated period for which the second message is to be received from the at least one electronic device, and
   wherein the estimated period is set in slots.

2. The method of claim 1, wherein at least one of the first message, the second message, or the third message comprises information related to a period for which the electronic device occupies a channel used to perform the ranging using the UWB.

3. The method of claim 1, wherein the transmitting of the third message comprises transmitting the third message, when the second message to respond to the first message is not received within the predetermined period from the at least one electronic device having received the first message.

4. The method of claim 1, wherein the predetermined period further comprises a period required for the at least one electronic device to scan a channel, the at least one of electronic devices being activated after the first message is broadcast or multicast.

5. The method of claim 1, wherein the broadcasting or multicasting of the first message comprises:
   identifying, based on a preamble signal, whether a channel is occupied; and
   broadcasting or multicasting the first message based on whether the channel is occupied.

6. A non-transitory computer-readable recording medium having recorded thereon a program for executing the method of claim 1 on a computer.

7. An electronic device for performing ranging using ultra wideband (UWB) in a wireless communication system, the electronic device comprising:
   at least one transceiver;
   at least one memory storing a program; and
   at least one processor configured to execute the program to:
   broadcast or multicast a first message to start the ranging, and
   transmit a third message, based on whether a second message to respond to the first message is received within a predetermined period from at least one electronic device of electronic devices having received the first message, wherein the predetermined period comprises an estimated period for which the second message is to be received from the at least one electronic device, and wherein the estimated period is set in slots.

8. The electronic device of claim 7, wherein at least one of the first message, the second message, or the third message comprises information related to a period for which the electronic device occupies a channel used to perform the ranging using the UWB.

9. The electronic device of claim 7, wherein the at least one processor is configured to transmit the third message, when the second message to respond to the first message is not received within the predetermined period from the at least one electronic device having received the first message.

10. The electronic device of claim 7, wherein the predetermined period further comprises a period required for the at least one electronic device to scan a channel, the at least one electronic device being activated after the first message is broadcast or multicast.

11. The electronic device of claim 7, wherein the at least one processor is configured to identify, based on a preamble signal, whether a channel is occupied, and broadcast or multicast the first message based on whether the channel is occupied.

* * * * *